(12) United States Patent
Maestas

(10) Patent No.: US 10,135,857 B2
(45) Date of Patent: *Nov. 20, 2018

(54) STRUCTURING DATA AND PRE-COMPILED EXCEPTION LIST ENGINES AND INTERNET PROTOCOL THREAT PREVENTION

(71) Applicant: Bandura, LLC, Catonsville, MD (US)

(72) Inventor: David E. Maestas, Lake St. Louis, MO (US)

(73) Assignee: Bandura, LLC, Catonsville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,367

(22) Filed: Jan. 3, 2018

(65) Prior Publication Data
US 2018/0131714 A1   May 10, 2018

Related U.S. Application Data

(60) Continuation of application No. 15/481,030, filed on Apr. 6, 2017, now Pat. No. 9,894,093, which is a (Continued)

(51) Int. Cl.
*G06F 21/00* (2013.01)
*H04L 29/06* (2006.01)
(Continued)

(52) U.S. Cl.
CPC ........ *H04L 63/1433* (2013.01); *G06F 21/554* (2013.01); *G06F 21/577* (2013.01);
(Continued)

(58) Field of Classification Search
CPC ............. H04L 63/1433; H04L 63/0236; H04L 63/1441; H04L 61/2007
See application file for complete search history.

(56) References Cited

U.S. PATENT DOCUMENTS 5,454,091 A  9/1995  Sites et al.
5,900,019 A  5/1999  Greenstein et al.
(Continued)

FOREIGN PATENT DOCUMENTS

CN  102289473 A  12/2011
EP  2498442 A1  9/2012
(Continued)

OTHER PUBLICATIONS

Chapman D. B. et al, Building Internet Firewalls, Building Internet Firewalls, Sebastopol, CA O'Reilly, US, Jan. 1, 1995 (Jan. 1, 1995), pp. 131-188, XP002202789 ISBN: 978-1-56592-124-5, 60 pgs.
(Continued)

*Primary Examiner* — Mahfuzur Rahman
(74) *Attorney, Agent, or Firm* — Stinson Leonard Street

(57) ABSTRACT

Blocking high-risk IP connections in real-time while allowing tailoring of an acceptable risk profile to match the security requirements of network resources. By acquiring IP threat information about IP addresses, traffic from IP addresses posing unacceptable levels of risk is blocked. A computer executed method is disclosed for sorting a plurality of internet protocol (IP) addresses. The method includes dividing the range of IP addresses into a plurality of clusters representing a plurality of contiguous sub-ranges, assigning each IP address to the cluster associated with the sub-range that includes that IP address, and assigning the IP addresses in each cluster to one of a plurality of pages. A network appliance incorporating aspects of the method is also disclosed.

17 Claims, 21 Drawing Sheets

Related U.S. Application Data continuation-in-part of application No. 15/155,853, filed on May 16, 2016, and a continuation-in-part of application No. 14/963,490, filed on Dec. 9, 2015, and a continuation of application No. 14/208,998, filed on Mar. 13, 2014, now Pat. No. 9,342,691, and a continuation of application No. 13/855,510, filed on Apr. 2, 2013, now Pat. No. 9,225,593, which is a division of application No. 12/509,957, filed on Jul. 27, 2009, now Pat. No. 8,468,220.

(60) Provisional application No. 61/782,669, filed on Mar. 14, 2013, provisional application No. 61/171,176, filed on Apr. 21, 2009.

(51) Int. Cl.
*H04L 29/12* (2006.01)
*G06F 21/55* (2013.01)
*G06F 21/57* (2013.01)

(52) U.S. Cl.
CPC ...... *H04L 61/2007* (2013.01); *H04L 63/0236* (2013.01); *H04L 63/0263* (2013.01); *H04L 63/1408* (2013.01); *H04L 63/1441* (2013.01); *G06F 2221/033* (2013.01); *G06F 2221/2111* (2013.01); *G06F 2221/2119* (2013.01)

(56) References Cited

U.S. PATENT DOCUMENTS

| | | | |
|---|---|---|---|
| 6,026,441 A | 2/2000 | Ronen | |
| 6,061,738 A | 5/2000 | Osaku et al. | |
| 6,151,624 A | 11/2000 | Teare et al. | |
| 6,332,158 B1 | 12/2001 | Risley et al. | |
| 6,442,602 B1 | 8/2002 | Choudhry | |
| 6,487,555 B1 | 11/2002 | Bharat et al. | |
| 6,499,095 B1 | 12/2002 | Sexton et al. | |
| 6,754,662 B1 | 6/2004 | Li | |
| 6,862,606 B1 | 3/2005 | Major et al. | |
| 7,065,888 B2 | 6/2006 | Jaklitsch et al. | |
| 7,136,547 B2 | 11/2006 | Brown et al. | |
| 7,240,059 B2 | 7/2007 | Bayliss et al. | |
| 7,353,360 B1 | 4/2008 | Muller et al. | |
| 7,369,557 B1 | 5/2008 | Sinha | |
| 7,409,406 B2 | 8/2008 | Agrawal et al. | |
| 7,444,318 B2 | 10/2008 | Sahni et al. | |
| 7,501,603 B2 | 3/2009 | Kalanovic | |
| 7,509,674 B2 | 3/2009 | Sterne | |
| 7,519,781 B1 | 4/2009 | Wilt | |
| 7,596,609 B1 | 9/2009 | Refuah et al. | |
| 7,602,785 B2 | 10/2009 | Dharmapurikar et al. | |
| 7,602,787 B2 | 10/2009 | Cheriton | |
| 7,609,875 B2 | 10/2009 | Liu et al. | |
| 7,647,329 B1 | 1/2010 | Fischman et al. | |
| 7,668,949 B1 | 2/2010 | Allan | |
| 7,689,485 B2 | 3/2010 | Kanekar et al. | |
| 7,724,138 B2 | 5/2010 | Horwitz et al. | |
| 7,725,470 B2 | 5/2010 | Richards et al. | |
| 7,725,934 B2 | 5/2010 | Kumar et al. | |
| 7,773,536 B2 | 8/2010 | Lloyd et al. | |
| 7,779,143 B2 | 8/2010 | Bu et al. | |
| 7,808,929 B2 | 10/2010 | Wong et al. | |
| 7,812,507 B2 | 10/2010 | Takahashi et al. | |
| 7,814,233 B2 | 10/2010 | Ellis | |
| 7,831,606 B2 | 11/2010 | Pandya | |
| 7,836,080 B2 | 11/2010 | DeBie | |
| 7,847,992 B2 | 12/2010 | Klug et al. | |
| 7,849,146 B2 | 12/2010 | Choi et al. | |
| 7,849,204 B2 | 12/2010 | Yared et al. | |
| 7,869,425 B2 | 1/2011 | Elliott et al. | |
| 7,904,642 B1 | 3/2011 | Gupta et al. | |
| 7,908,263 B1 | 3/2011 | Paiz | |
| 7,925,666 B1 | 4/2011 | Johnson et al. | |
| 7,932,925 B2 | 4/2011 | Inbar et al. | |
| 7,940,960 B2 | 5/2011 | Okada | |
| 7,945,941 B2 | 5/2011 | Sinha et al. | |
| 7,949,657 B2 | 5/2011 | Mityagin et al. | |
| 7,958,549 B2 | 6/2011 | Nakae et al. | |
| 7,961,711 B2 | 6/2011 | Marucheck et al. | |
| 7,967,813 B2 | 6/2011 | Cooper et al. | |
| 7,996,348 B2 | 8/2011 | Pandya | |
| 8,010,085 B2 | 8/2011 | Apte et al. | |
| 8,018,940 B2 | 9/2011 | Hao et al. | |
| 8,040,882 B2 | 10/2011 | Chung et al. | |
| 8,041,773 B2 | 10/2011 | Abu-Ghazaleh et al. | |
| 8,078,826 B2 | 12/2011 | Mukherjee | |
| 8,108,383 B2 | 1/2012 | Lin et al. | |
| 8,122,148 B2 | 2/2012 | Kim et al. | |
| 8,123,740 B2 | 2/2012 | Madhani et al. | |
| 8,174,588 B1 | 5/2012 | McKinley et al. | |
| 8,272,044 B2 | 9/2012 | Ansari et al. | |
| 8,296,312 B1 | 10/2012 | Leung et al. | |
| 8,316,064 B2 | 11/2012 | Hsu | |
| 8,375,141 B2 | 2/2013 | Rowstron et al. | |
| 8,468,220 B2 | 6/2013 | Maestas | |
| 8,559,434 B2 | 10/2013 | Esteve Rothenberg et al. | |
| 8,589,503 B2 | 11/2013 | Alperovitch et al. | |
| 8,843,751 B2 | 9/2014 | Camarillo et al. | |
| 8,881,277 B2 | 11/2014 | Kay | |
| 2001/0047396 A1 | 11/2001 | Nellemann et al. | |
| 2002/0059234 A1 | 5/2002 | Gumpertz et al. | |
| 2002/0099691 A1 | 7/2002 | Lore et al. | |
| 2003/0163445 A1 | 8/2003 | Oza et al. | |
| 2004/0019477 A1 | 1/2004 | Finkelstein | |
| 2004/0128355 A1 | 7/2004 | Chao et al. | |
| 2004/0230696 A1 | 11/2004 | Barach et al. | |
| 2005/0018683 A1 | 1/2005 | Zhao et al. | |
| 2005/0083937 A1 | 4/2005 | Lim | |
| 2006/0085849 A1 | 4/2006 | Culbert | |
| 2006/0098585 A1 | 5/2006 | Singh et al. | |
| 2007/0028244 A1 | 2/2007 | Landis et al. | |
| 2007/0061458 A1 | 3/2007 | Lum | |
| 2007/0283125 A1 | 12/2007 | Manczak et al. | |
| 2008/0010678 A1 | 1/2008 | Burdette et al. | |
| 2008/0056262 A1 | 3/2008 | Singh | |
| 2008/0186970 A1 | 8/2008 | Wisener et al. | |
| 2009/0019254 A1 | 1/2009 | Stecher | |
| 2009/0063657 A1 | 3/2009 | Samuels et al. | |
| 2009/0089869 A1 | 4/2009 | Varghese | |
| 2009/0106207 A1 | 4/2009 | Solheim et al. | |
| 2010/0088461 A1 | 4/2010 | Yang et al. | |
| 2010/0175124 A1 | 7/2010 | Miranda | |
| 2010/0195538 A1 | 8/2010 | Merkey et al. | |
| 2011/0252228 A1 | 10/2011 | Chang et al. | |
| 2012/0167210 A1 | 6/2012 | Oro Garcia et al. | |

FOREIGN PATENT DOCUMENTS

| | | |
|---|---|---|
| JP | 2005532713 A | 10/2005 |
| TW | 200915113 A | 4/2009 |
| WO | 2010/123546 A2 | 10/2010 |

OTHER PUBLICATIONS

Dharmapurikar, Sarang et al., Fast Packet Classification Using Bloom Filters, ACM/IEEE Symposium on Architecture for Networking and Computing Systems, Dec. 5, 2006, pp. 61-70.

Kumar, Abhishek et al., Space-Code Bloom Filter for Efficient Per-Flow Traffic Measurement, IEEE Journal on Selected Areas in Communications, vol. 24, Issue 12, Dec. 2006, pp. 2327-2339.

Lu, Haibin et al., Prefix and Interval-Partitioned Dynamic IP Router-Tables, IEEE Transactions on Computers, vol. 54, Issue 5, May 2005, pp. 545-557.

Pankaj, Gupta et al., Algorithms for Packet Classification, IEEE, Mar./Apr. 2001, pp. 24-32.

Ravikumar, V.C. et al., EaseCAM: An Energy and Storage Efficient TCAM-Based Router Architecture for IP Lookup, IEEE Transactions on Computers, vol. 54, Issue 5, May 2005, pp. 521-533.

(56) References Cited

OTHER PUBLICATIONS

Song, Haoyu et al., IPv6 Lookups using Distributed and Load Balanced Bloom Filters for 100Gbps Core Router Line Cards, IEEE Infocom, Apr. 25, 2009, pp. 2518-2526.

Song, Haoyu et al., Fast Hash Table Lookup Using Extended Bloom Filter: An Aid to Network Processing, Proceedings of the 2005 Conference on Applications, Technologies, Architectures, and Protocols for Computer Communications, ACM SIGCOMM, vol. 35, Issue 4, Oct. 2005, pp. 181-192.

Stepanov, Alexander et al., The Standard Template Library, HP Labs, Tech Report 95-11 (R. 1), X3J16/94-0095, Oct. 31, 1995, 66 pages.

Wang, Yi-Min et al., Subscription Partitioning and Routing in Content-based Publish/Subscribe Systems, DISC 2002: Proceedings of International Symposium on Distributed Computing, 2004, 8 pages.

International Preliminary Report on Patentability, dated Feb. 20, 2014, of corresponding application PCT/US2010/001161.

European Search Report in related application EP15154202.4, dated May 20, 2015.

Supplemental European Search Report in related application EP10767414.5, dated May 20, 2015.

Partial Supplementary European Search Report for related application PCT/US2014/025741 dated Oct. 10, 2016, 8 pages.

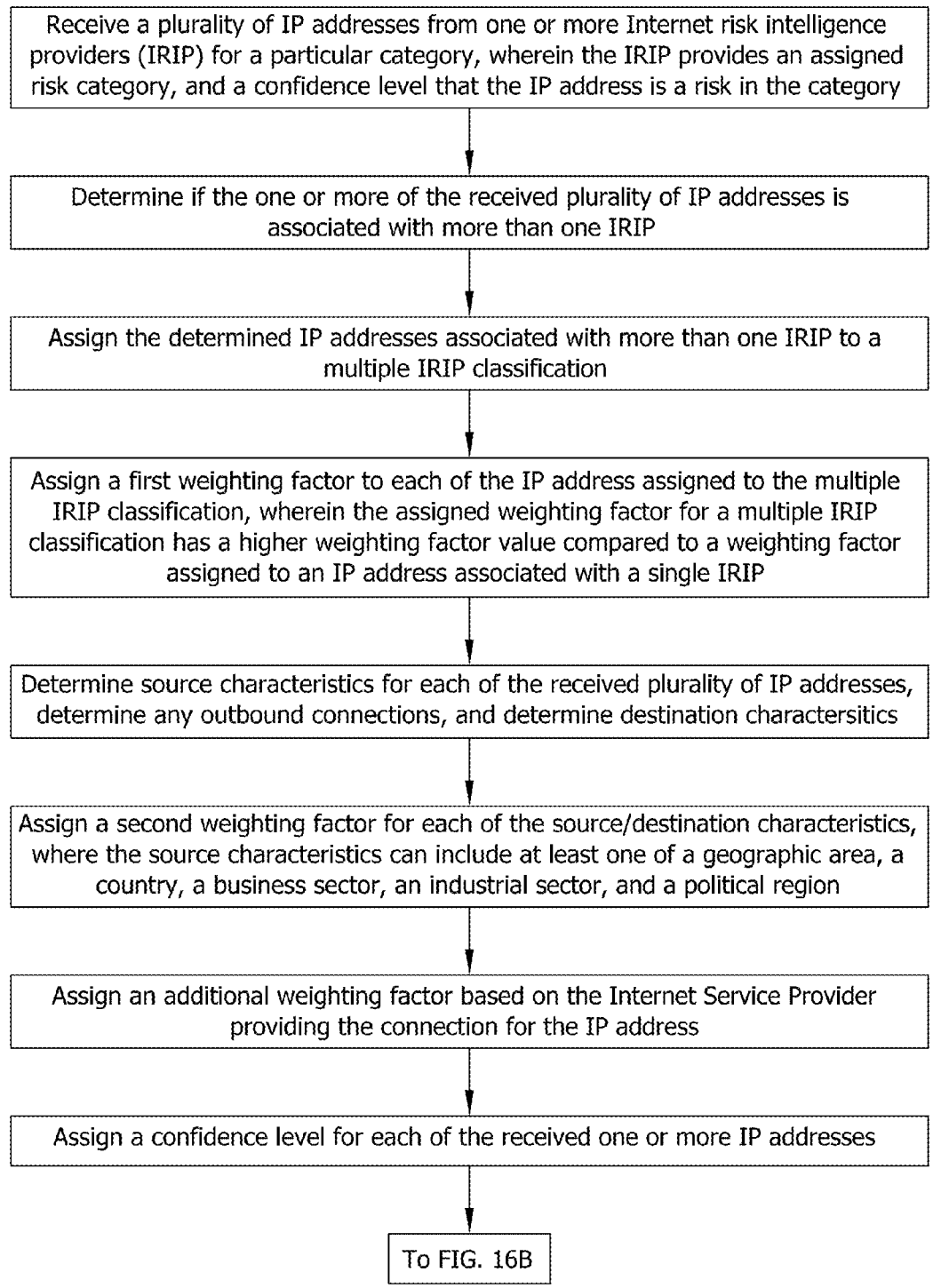

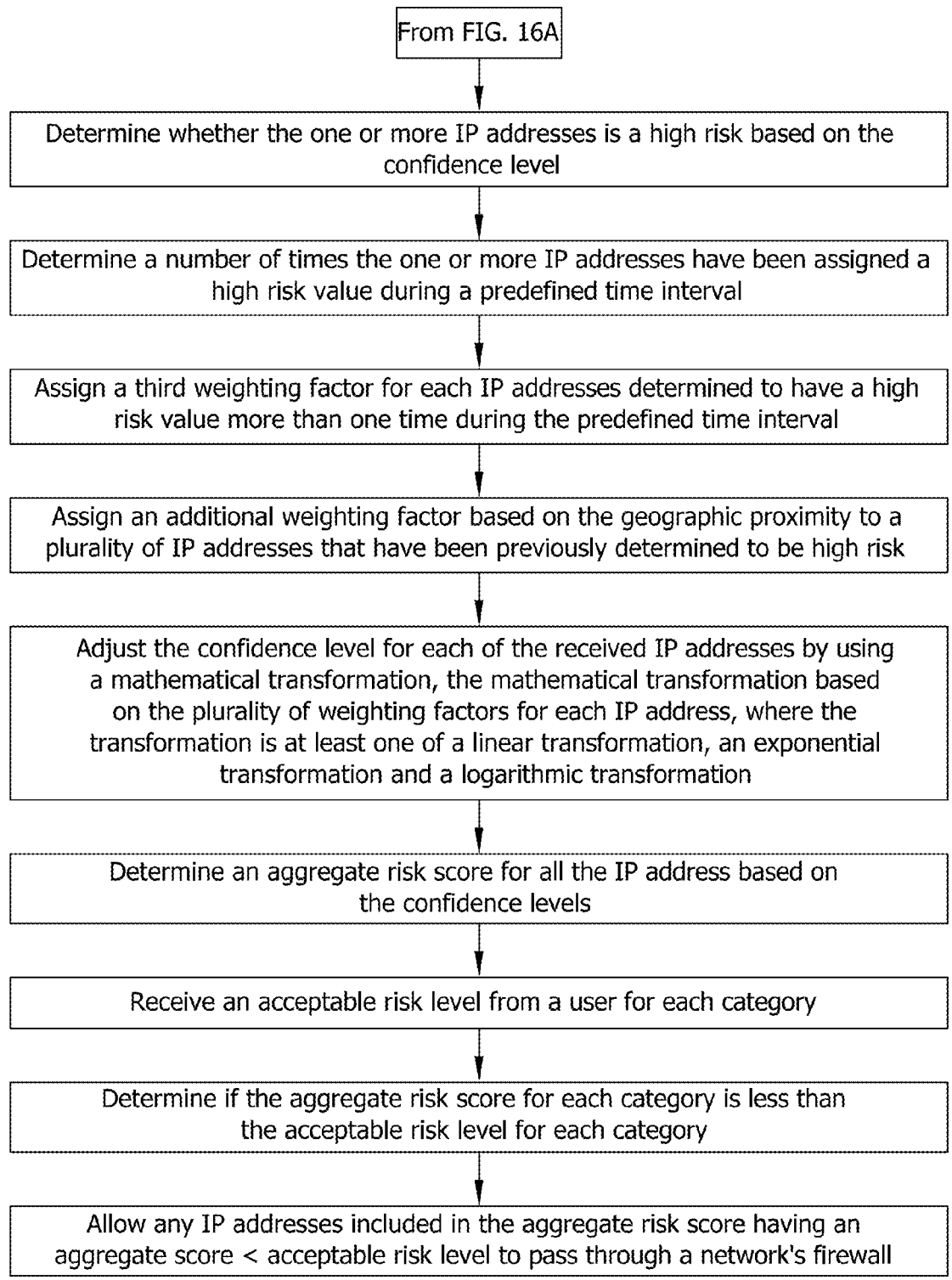

STRUCTURING DATA AND PRE-COMPILED EXCEPTION LIST ENGINES AND INTERNET PROTOCOL THREAT PREVENTION

CROSS-REFERENCE TO RELATED APPLICATIONS

This application is a continuation of U.S. patent application Ser. No. 15/481,030, filed Apr. 6, 2017, which is a continuation-in-part of U.S. patent application Ser. No. 14/963,490, filed Dec. 9, 2015, which is a continuation of U.S. patent application Ser. No. 13/855,510, filed Apr. 2, 2013, now U.S. Pat. No. 9,225,593, which is a divisional of U.S. application Ser. No. 12/509,957, filed Jul. 27, 2009, now U.S. Pat. No. 8,468,220, which claims the benefit of U.S. Provisional Application No. 61/171,176, filed on Apr. 21, 2009. U.S. patent application Ser. No. 15/481,030, filed Apr. 6, 2017 is also a continuation-in-part of U.S. patent application Ser. No. 15/155,853, filed May 16, 2016, which is a continuation of U.S. patent application Ser. No. 14/208,998, filed Mar. 13, 2014, now U.S. Pat. No. 9,342,691, which claims the benefit of U.S. Provisional Application Ser. No. 61/782,669, filed Mar. 14, 2013. The entire disclosures of the above-referenced applications are incorporated herein by reference for all purposes.

TECHNICAL FIELD

The present disclosure generally relates to network security, methods of structuring data for high speed searching, pre-compiled exception list engines incorporating such structured data and network appliances including such engines.

BACKGROUND

This section provides background information related to the present disclosure which is not necessarily prior art.

There are various known methods of structuring a set of data elements and of searching the set of data elements to locate a desired element. The data elements may be left unstructured or may be structured according to some principle, such as numerically, alphabetically, etc. The data set may, for example, be searched linearly by looking at each item in the set in order or by using a binary search, which repeatedly divides the set in half and determines whether the desired element is above, below or equal to the dividing point of the set.

As the number of elements in a data set increases, many known methods of structuring and/or searching the data set become cumbersome. Such methods may become slower, require more processor power, and/or memory.

Computing devices connected to the Internet face constant security risks. Computer services connected to the Internet, especially public-facing services, face attacks designed to deprive access to the resource (i.e., denial of service), disrupt access to the resource (e.g., to make political statements), or provide illegal access to the resource (e.g., for monetary reasons). Internet-connected devices inside the firewall of a protected network are at risk when communicating with resources outside the firewall. These devices inside the firewall may become infected with malware that attempts to enlist them in a bot-net or that attempts to send personal and/or financial information to unauthorized entities on the Internet.

At one time, adding access rules into a firewall to restrict inbound or outbound Internet connections addressed this problem. However, today's hackers and cyber-criminals are much more sophisticated and are able to hide their identities by connecting through proxies, anonymizers, and computers that have been enlisted into a bot-net controlled by the attacker. Simply blocking an Internet Protocol (IP) address is insufficient to prevent attacks because the IP addresses used by attackers can change daily, hourly, and sometimes even more frequently. Further, having only two options (i.e., blocked or not blocked) does not provide adequate flexibility for assessing threats. And creating exceptions is manually intensive.

An Internet Risk Intelligence Provider (IRIP) is an entity that monitors Internet network nodes for signs of malicious activity and provides access to its findings. Upon detecting possibly malicious activity, an IRIP adds the IP address associated with the activity to a downloadable list or a real-time feed. Along with the IP address, the IRIP includes the risk category of the potential risk and a confidence score, which indicates the probability that the detected IP address is actually a risk. A typical IRIP is capable of monitoring millions of IP addresses and, thus, a typical list of IP addresses may number in the millions. Unfortunately, conventional firewalls and routers normally used to stop high-risk IP addresses from connecting into or out of a network are capable of blocking only a small percentage of the IP addresses. (e.g., 10,000 up to 100,000 IP addresses). In addition to the disadvantages described above, firewalls and routers also require the access rules that determine which IP addresses will be blocked (i.e., risk blocking) to be constantly updated in real-time as the threat environment changes. What is needed is a practical way to block high-risk IP connections in real-time while allowing users to tailor their acceptable risk profiles to match the security requirements of their network resources.

SUMMARY

According to one aspect of the present disclosure, a computer executed method is disclosed for sorting a plurality of Internet protocol (IP) addresses, each of which has a numeric value within a range of numeric values. The method includes dividing the range into a plurality of clusters representing a plurality of contiguous sub-ranges. Each sub-range encompasses substantially the same number of numeric values of the range and each sub-range associated with a different cluster. The method also includes assigning each IP address to the cluster associated with the sub-range that includes the numeric value of that IP address. Each cluster has a cluster size defined by the number of IP addresses assigned to that cluster. The IP addresses in each cluster are assigned to one of a plurality of pages. Each page has a page size limit defining the maximum number of IP addresses that can be assigned to that page. Each page has a page size defined by the number of IP addresses assigned to that page. If one of the pages has a page size less than its page size limit, the method includes duplicating on that page at least one of the IP addresses assigned to that page to increase the page size of that page. For each page, the IP addresses assigned to that page are ordered by numeric value.

According to another aspect of the present disclosure, a computer executed method is disclosed for sorting a plurality of internet protocol (IP) addresses, each of which has a numeric value within a range of numeric values. The method includes dividing the range into a plurality of clusters representing a plurality of contiguous sub-ranges. Each sub-range encompasses substantially the same number of numeric values of the range and each sub-range associated with a different cluster. The method also includes assigning each IP address to the cluster associated with the sub-range that includes the numeric value of that IP address. Each cluster has a cluster size defined by the number of IP addresses assigned to that cluster. The method includes ordering the clusters by cluster size. The IP addresses in each cluster are assigned to one of a plurality of pages. Each page has a same page size limit defining the maximum number of IP addresses that can be assigned to that page. Each page has a page size defined by the number of IP addresses assigned to that page. If one or more of said pages has a page size less than its page size limit, the method includes duplicating on said page one or more of the IP addresses assigned to that page to increase the page size of said page to its page size limit. For each page, the IP addresses assigned to that page are ordered by numeric value.

According to yet another aspect of the present disclosure a network appliance for connection to a first network is disclosed. The appliance includes at least one input coupled to the first network for receiving a packet from the first network. The packet includes an internet protocol (IP) address. The appliance also includes at least one processor for determining whether to allow the packet from the first network to proceed and at least one memory device storing instructions and data. The data includes a plurality of pages storing a plurality of excepted IP addresses. The excepted IP addresses each has a numeric value within a range. The range is divided into a plurality of contiguous sub-ranges and each page includes one or more of the excepted IP addresses having numeric values within one or more of the sub-ranges associated with that page. Each page has a page size defined by the number of IP addresses assigned to that page. The excepted IP addresses are assigned to each page ordered by numeric value. The at least one processor is configured via the instructions to identify the IP address of the packet from the first network, identify a target page that will include the IP address if the IP address is one of the plurality of excepted IP addresses, search the target page to determine if the IP address is one of the excepted IP addresses in the target page, and process the packet from the first network according to whether the IP address is an excepted IP address in the target page.

According to another aspect of the present application, a network appliance for connection to a first network includes at least one input coupled to the first network for receiving a packet from the first network. The packet includes an internet protocol (IP) address. The appliance includes at least one processor for determining whether to allow the packet from the first network to enter the second network and at least one memory device. The appliance also includes a first engine stored in the memory device. The first engine includes a plurality of pages storing a plurality of excepted IP addresses. The excepted IP addresses each has a numeric value within a range of numeric values and the range is divided into a plurality of contiguous sub-ranges. Each page includes one or more of the excepted IP addresses having numeric values within one or more of the sub-ranges associated with that page. Each page has a page size defined by the number of excepted IP addresses assigned to that page. The excepted IP addresses are assigned to each page ordered by numeric value. The first engine also includes a first finite state machine (FSM). The first FSM includes instructions executable by the processor to determine the page associated with the sub-range encompassing the IP address and output an indication of the page associated with the sub-range encompassing the IP address. The engine also includes instructions executable by the processor to search the page associated with the sub-range encompassing the IP address to determine if the IP address is an excepted IP address, and output an indication of whether the IP address is an excepted IP address. The processor is also configured via instructions stored in the memory device to process the packet from the first network according to the indication from the first engine.

Briefly, aspects of the invention permit blocking high-risk IP connections in real-time while allowing users to tailor their acceptable risk profiles to match the security requirements of their network resources. IP threat information is acquired from one or more providers via a feed (e.g., based on eXtensible Markup Language (XML) or JavaScript Object Notation (JSON)). The information includes, for example, an IP address, a named risk category, and a confidence level that the listed IP address is actually a threat within the named category. Advantageously, the category names from each provider are mapped into a set of common category names to resolve potential naming conflicts. An aggregate risk score based on the individual risk scores takes into account confidence levels assigned by IRIPs, the number of times an IP address has been listed as high-risk over a predefined time interval, and the time interval since the last time the IP address was listed. In addition, weighting the scores from the IRIP data improves threat assessment.

In an aspect, a computer-implemented method of assessing a risk associated with an IP address for a risk category comprises storing a plurality of threat information in a memory device. The threat information includes the IP address, a risk category associated with the IP address, and a risk confidence level associated with the IP address. In addition, the method comprises storing a risk category acceptance level in the memory device and determining a risk category value associated with the IP address. According to the method, the risk category value is determined as a function of the risk confidence level, a number of instances the risk confidence level has exceeded the risk category acceptance level during a first time interval, and a second time interval representing the elapsed time since the risk confidence level previously exceeded the risk category acceptance level. The method further comprises storing the risk category value in the memory device and rendering a decision as to the threat associated with the IP address for the risk category as a function of the risk category value and the risk category acceptance level.

In another aspect, a processor-implemented method of determining an aggregate risk score for a plurality of IP address comprises receiving a plurality of IP addresses from one or more IRIPs for a particular category via a computer communications network. In addition, the method includes determining source characteristics for each of the received IP addresses, and assigning weighting factors to the source characteristics, and mathematically transforming the weighted source characteristics to adjust a risk confidence level for each of the received IP addresses. The method further comprises determining an aggregate risk score for the IP addresses based on the adjusted confidence levels for the IP addresses and allowing traffic from each of the IP addresses having an aggregate risk score below an acceptable level of risk.

In yet another aspect, a system for determining risk for a plurality of IP addresses received in real-time from a plurality of sources comprises a memory for storing a plurality of IP addresses and a date and a time, an assigned risk category, and a confidence level for each IP address. A graphical user interface displays a plurality of categories associated with each IP address and accepts input, including an acceptable risk level for each of the plurality of categories, from a user. The system also includes a computer processor for executing computer-executable instructions for receiving a plurality of IP addresses from one or more IRIPs for a particular category, determining if the one or more received IP addresses are associated with more than one category, determining source characteristics for each of the received IP addresses for a category, assigning a weighting factor to each of the source characteristics for each category, adjusting a confidence level for each of the received IP addresses by using a mathematical transform based on the weighting factors for each category, determining an aggregate risk score for all the IP addresses based on the adjusted confidence levels, receiving an acceptable risk level from a user for each category, comparing the aggregate risk score with the received acceptable risk level from the user, and allowing any IP addresses having an aggregate risk score below the acceptable risk level to pass through the network's firewall.

In yet another aspect, a computer network firewall system comprises at least one tangible, non-transitory a computer-readable medium storing processor-executable instructions. A threat assessment processor is programmed to execute the instructions. And, when executed by the processor, the instructions store a plurality of threat information on the computer-readable medium. The threat information includes an IP address, a risk category associated with the IP address, and a risk confidence level associated with the IP address. In addition, the executed instructions store a risk acceptance level and determine a risk value associated with the IP address as a function of the risk confidence level, a number of instances the risk confidence level has exceeded a threshold level during a first time interval, and a second time interval representing the elapsed time since the risk confidence level previously exceeded the threshold level. The executed instruction further compare the risk value with the risk acceptance level and block computer network communications with a computing device associated with the IP address when the risk value is greater than or equal to the risk acceptance level.

Other objects and features will be in part apparent and in part pointed out hereinafter.

BRIEF DESCRIPTION OF THE DRAWINGS

FIGS. 16A-16B is a diagram of an exemplary aggregation process in accordance with an embodiment of the invention.

Corresponding reference characters indicate corresponding parts throughout the drawings.

DETAILED DESCRIPTION

Methods of Structuring Data, Pre-Compiled Exception List Engines, and Network Appliances Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The method steps, processes, and operations described herein are not to be construed as necessarily requiring their performance in the particular order discussed or illustrated, unless specifically identified as an order of performance. It is also to be understood that additional or alternative steps may be employed.

Figure 1:
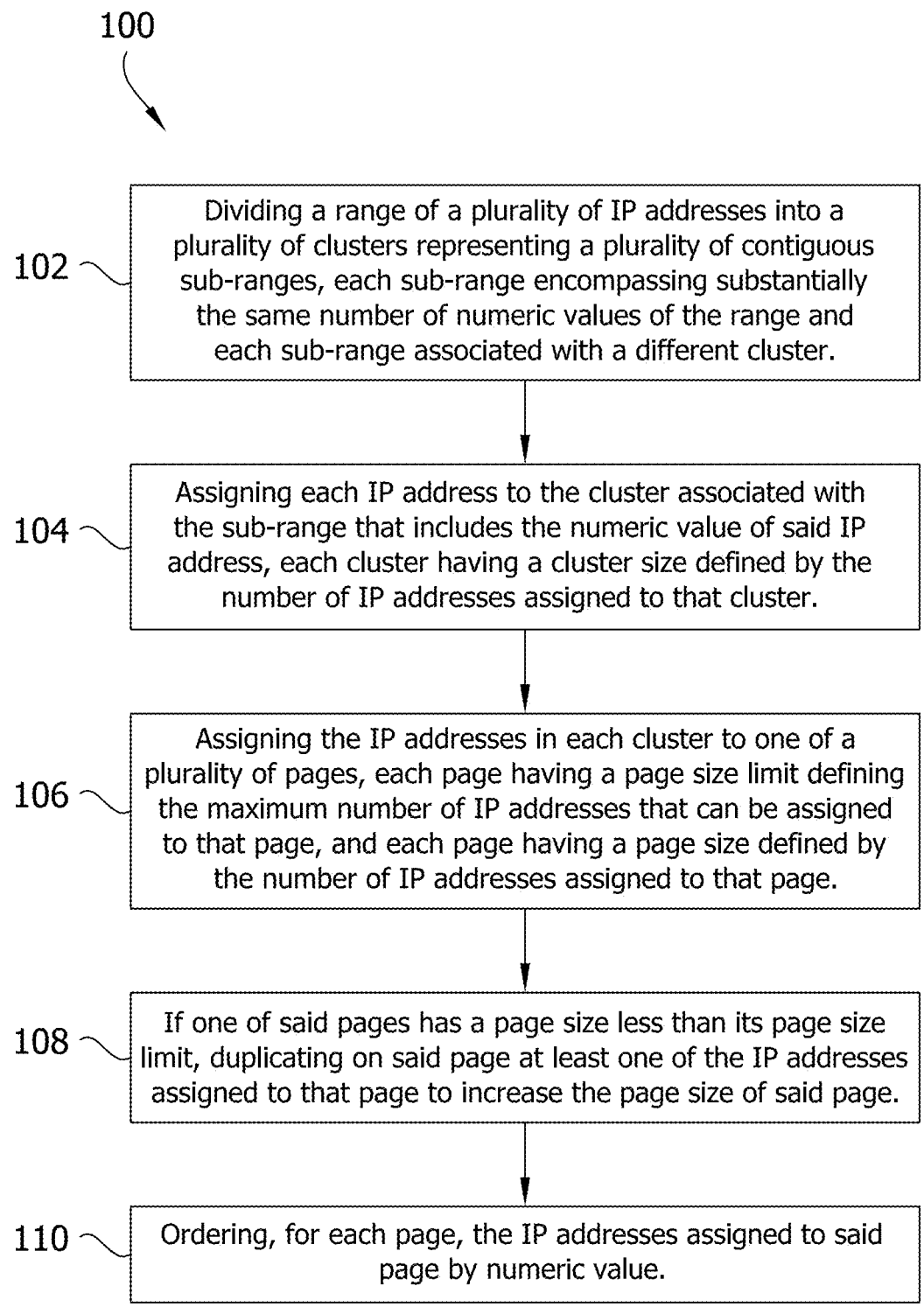
FIG. 1 is a flow chart illustrating a computer executed method for sorting a plurality of IP addresses according to one aspect of the present disclosure.

According to one aspect of the present disclosure, a method, generally indicated by the reference numeral 100 in FIG. 1, is disclosed for sorting a plurality of internet protocol (IP) addresses, each of which has a numeric value within a range of numeric values. The method includes, at 102, dividing the range into a plurality of clusters representing a plurality of contiguous sub-ranges. Each sub-range encompasses substantially the same number of numeric values of the range and each sub-range associated with a different cluster. The method also includes, at 104, assigning each IP address to the cluster associated with the sub-range that includes the numeric value of that IP address. Each cluster has a cluster size defined by the number of IP addresses assigned to that cluster. At 106, the IP addresses in each cluster are assigned to one of a plurality of pages. Each page has a page size limit defining the maximum number of IP addresses that can be assigned to that page. Each page has a page size defined by the number of IP addresses assigned to that page. At 108, if one of the pages has a page size less than its page size limit, the method includes duplicating on that page at least one of the IP addresses assigned to that page to increase the page size of that page. For each page, the IP addresses assigned to that page are ordered at 110 by numeric value.

IP addresses are numerical identifiers of devices in a network. Each IP address typically has a numerical value and is stored as a binary number. There are multiple IP addresses versions, such as IPv4 and IPv6. IPv4 addresses are 32 bit numbers, while IPv6 addresses are 128 bit numbers. IPv4 addresses are often represented in human friendly decimal notation as four three digit numbers separated by decimal points (e.g. 000.000.000.000). Extra leading zeros are sometimes removed from the decimal notation, but are included above for explanatory purposes. Each of the numbers is actually represented by eight bits. An eight bit number can represent decimal numbers between 0 and 255). Thus, each of the four numbers of the IP address may be between 0 and 255. The method disclosed herein is not version specific and may be used with any version of IP addresses. The size of the range encompassing a set of all IP addresses is determined by the bit size of that version's IP addresses. For example IPv4 addresses are 32 bits long resulting in a range of $2^{32}$ possible IP addresses. Similarly, the range of IPv6 addresses is $2^{128}$ possible IP addresses. The range of the IP addresses according to the method disclosed herein may be the range of all possible IP addresses (e.g., 0 to $2^{32}-1$ for IPv4 addresses) or any appropriate subset of all possible IP addresses.

Figure 2:
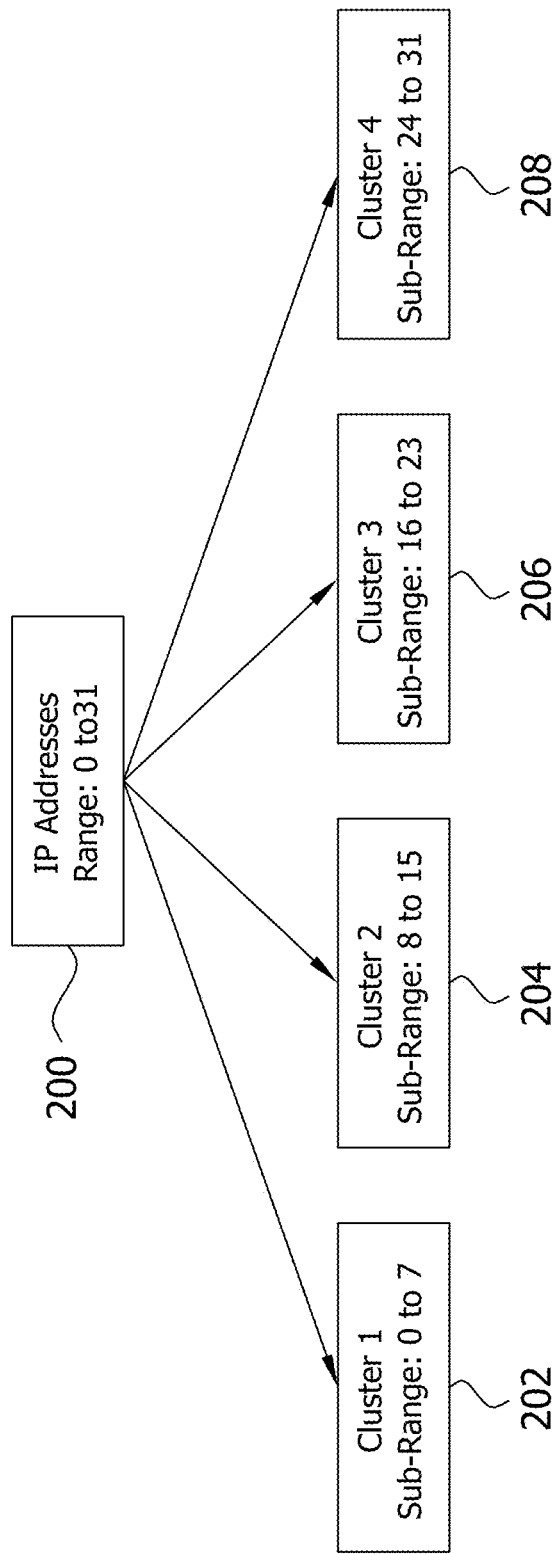
FIG. 2 is a block illustration of dividing a range of IP addresses into a plurality of clusters each having a sub-range of the range.

Whatever the range, the method includes dividing the range into a plurality of clusters representing a plurality of contiguous sub-ranges, an example of which is shown in FIG. 2, and assigning each IP address to the cluster associated with the sub-range that includes the numeric value of that IP address. Each of the clusters has cluster size defined by the number of IP addresses assigned to that cluster. The size of the sub-ranges is the number of IP addresses that could be placed in the cluster. In FIG. 2, for example a plurality of IP addresses 200 having a range between 0 and 31, inclusive is divided into four clusters 202, 204, 206 and 208. Each cluster 202, 204, 206, 208 has a sub-range size of eight possible IP addresses. The size of a cluster 202, 204, 206 or 208 depends on how many IP addresses from the plurality of IP addresses 200 are encompassed by the sub-range of that cluster 202, 204, 206 or 208. A cluster is simply a set. Numerous possible implementations of clusters are possible. According to some embodiments the clusters are implemented by a map, an array, a list, a hash table, etc. According to at least one embodiment, the clusters are managed and/or searched using a Standard Template Library (STL) list.

The plurality of contiguous sub-ranges may be determined in numerous different ways. As will be explained more fully below, after the clusters have been populated with the IP addresses from the plurality of IP addresses, the IP addresses will be assigned to pages by cluster. Each page may have a page size limit, also known as a maximum size, that may be expressed in terms of a number of IP addresses or a bit size. Although page sizes, cluster sizes, and page size limits will be discussed herein in terms of number of IP addresses, it should be understood that bit sizes may be interchangeably used. For example, a page size limit of one IP address is the same as a page size limit of 32 bits for IPv4 addresses or 128 bits for IPv6 addresses). Because of the page size limit, each cluster may have no more IP addresses assigned to it than the page size limit. One technique for determining the plurality of sub-ranges is to assign each sub-range the same number of numeric values, where the number of numeric values is equal to the page size limit. With such a division, no cluster could include more IP addresses than the page size limit. This way of dividing the range will work with any number of IP addresses, with any range of IP addresses, and with any distribution of IP addresses. However, such a division results in a very large number of clusters. Additionally, as the plurality of IP addresses may be widely spread over the range and may not be linearly distributed over the range. Thus there may be many clusters with no IP addresses in those clusters sub-ranges.

Accordingly, in some embodiments, the range may be divided into as few clusters as possible while still avoiding any cluster having a cluster size greater than the page size limit. Various techniques, including various heuristic techniques, are available for determining the number of clusters and the size of the sub-ranges to minimize the number of clusters and maximize the size of the sub-ranges of the clusters. One technique to minimize the number of clusters is to begin with one cluster. When the IP addresses are assigned to the cluster, as soon as (or if) the number of IP addresses assigned to the cluster exceeds the page size limit, the assigning is stopped, the number of clusters is doubled (to two) and the assigning begins again. The process stops and the cluster size is again doubled as soon as the number of IP addresses assigned to any cluster exceeds the page size limit. The process is repeated until the number of IP addresses assigned to each cluster is less than or equal to the page size limit. With a large number of IP addresses such a technique may require numerous iterations and a relatively long time.

Another technique assumes that the IP addresses are relatively linearly distributed and divide the number of IP addresses in the plurality of addresses by the page size limit. Thus, for example, if the page size limit is $2^{10}$ and the number of IP addresses is $2^{16}$, the number of clusters is $2^{6}$. If the range is all IPv4 addresses, the range is $2^{32}$. Dividing the range ($2^{32}$) by the number of clusters ($2^{6}$) indicates that each cluster has a sub-range of $2^{26}$ IP addresses. According to some embodiments this sub-range is then incremented to the next power of two (i.e., incremented to $2^{27}$ in this example) and the number of clusters is correspondingly decreased by a power of two (i.e. decreased to $2^{5}$ in this example).

Figure 3:
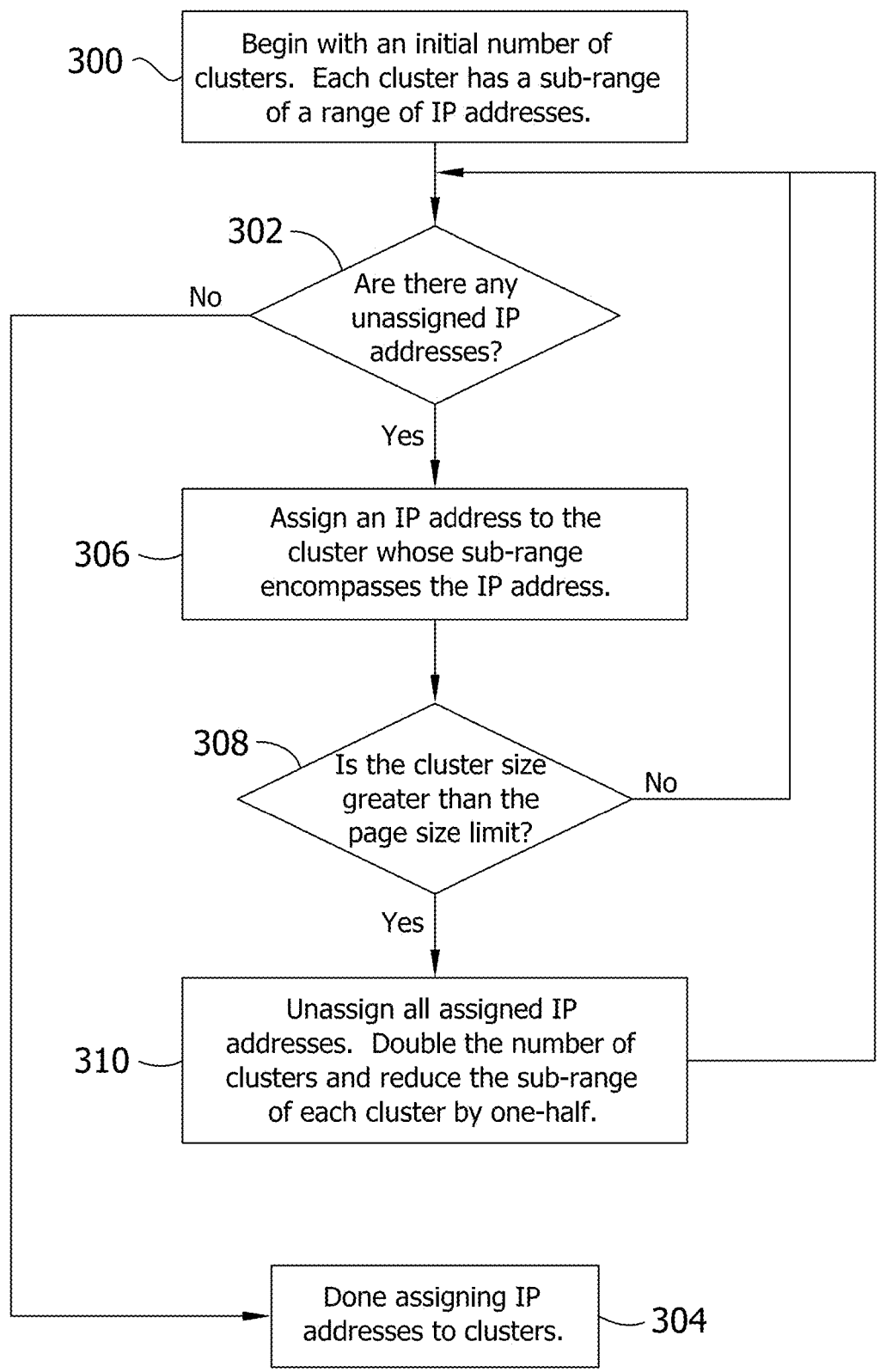
FIG. 3 is a flow diagram illustrating one embodiment of assigning a plurality of IP addresses to a plurality of clusters.

However an initial number of clusters is determined, the iterative technique discussed above may be applied to ensure that no cluster has a cluster size larger than the page size limit. A flow diagram of the process is illustrated in FIG. 3. In the techniques discussed in the preceding paragraph a linear distribution is assumed. If this assumption is correct, the number of clusters determined by dividing the number of IP addresses by the page size limit will result in no cluster having a cluster size larger than the page size limit. If however, the IP addresses are not linearly distributed or possibly if the number of clusters is decreased by a power of two as discussed above, some of the clusters may have a cluster size greater than the page limit size. According to some embodiments, therefore, the number of clusters is doubled (increased by a power of two) and the assigning of IP addresses to clusters is restarted when any cluster's cluster size exceeds the page size limit. The comparison may be done as the IP addresses are being assigned to the clusters or after all IP addresses have been assigned to clusters. Referring again to FIG. 3, at 300 the process begins with an initial number of clusters. Each cluster has a sub-range of a range of IP addresses. The process continues at 302 by determining if there are any having IP addresses that have not been assigned to a cluster. If not, the process is complete at 304 and all IP addresses have been assigned to clusters. If, however, there are unassigned IP addresses, the process continues to 306 and the unassigned IP addresses are assigned to the cluster whose sub-range encompasses the unassigned IP address. At 308, the cluster size of the cluster to which the unassigned IP addresses were assigned is compared to the page size limit. If the cluster size is not greater than the page size limit, the process returns to 302. If the cluster size of the cluster does exceed the page size limit, at 310 all previously assigned IP addresses are unassigned, the number of clusters is doubled, the size of the sub-ranges is reduced by one-half, and the process returns to 302. The process of stopping, doubling the number of clusters (and decreasing the size of the sub-ranges) and restarting the assigning of IP addresses to clusters may be repeated until the cluster sizes are all less than or equal to the page size limit. By using this technique and deliberately starting with a number of clusters that would result in cluster sizes greater than the page size limit, the number of clusters can be minimized.

After the IP addresses have been assigned to the appropriate clusters, the clusters may be ordered. The clusters are ordered by cluster size. The ordering may be in order of increasing or decreasing cluster size. Additionally, or alternatively, a cluster list may be created. The cluster list contains all clusters and their associated data, including the IP addresses assigned to each cluster. The clusters may be ordered by cluster size in the cluster list.

The IP addresses in each cluster are assigned to one of a plurality of pages. In one embodiment, the pages are an array of contiguous memory bytes. Each page has a page size limit defining the maximum number of IP addresses that can be assigned to that page and a page size defined by the number of IP addresses assigned to that page. In other embodiments, pages can be implemented in various other ways, such as using binary trees.

Generally, the page size limit(s) may be any appropriate size. According to some embodiments, however, it is preferred that the page size limit be a size that will result in a page with a size small enough to be stored in cache memory of a processor with which the page will be used. Such preferred page sizes increase cache locality. Data stored in a processor's cache memory may be accessed, manipulated, etc. much faster than data stored remote from the processor. Thus, a page size limit small enough that a page may be entirely loaded into cache memory may increase the speed at which the pages can be searched. Different pages may have different page size limits. In some embodiments, however, the page size limit of each page is the same.

The IP addresses in the clusters may be assigned to pages according to various techniques. Initially, at least one page is created. Although the cluster can be simple assigned one cluster to one page, other techniques may be preferable. Thus, according to some embodiments, the clusters are assigned to pages according to either a first fit or a best fit algorithm.

Figure 4:
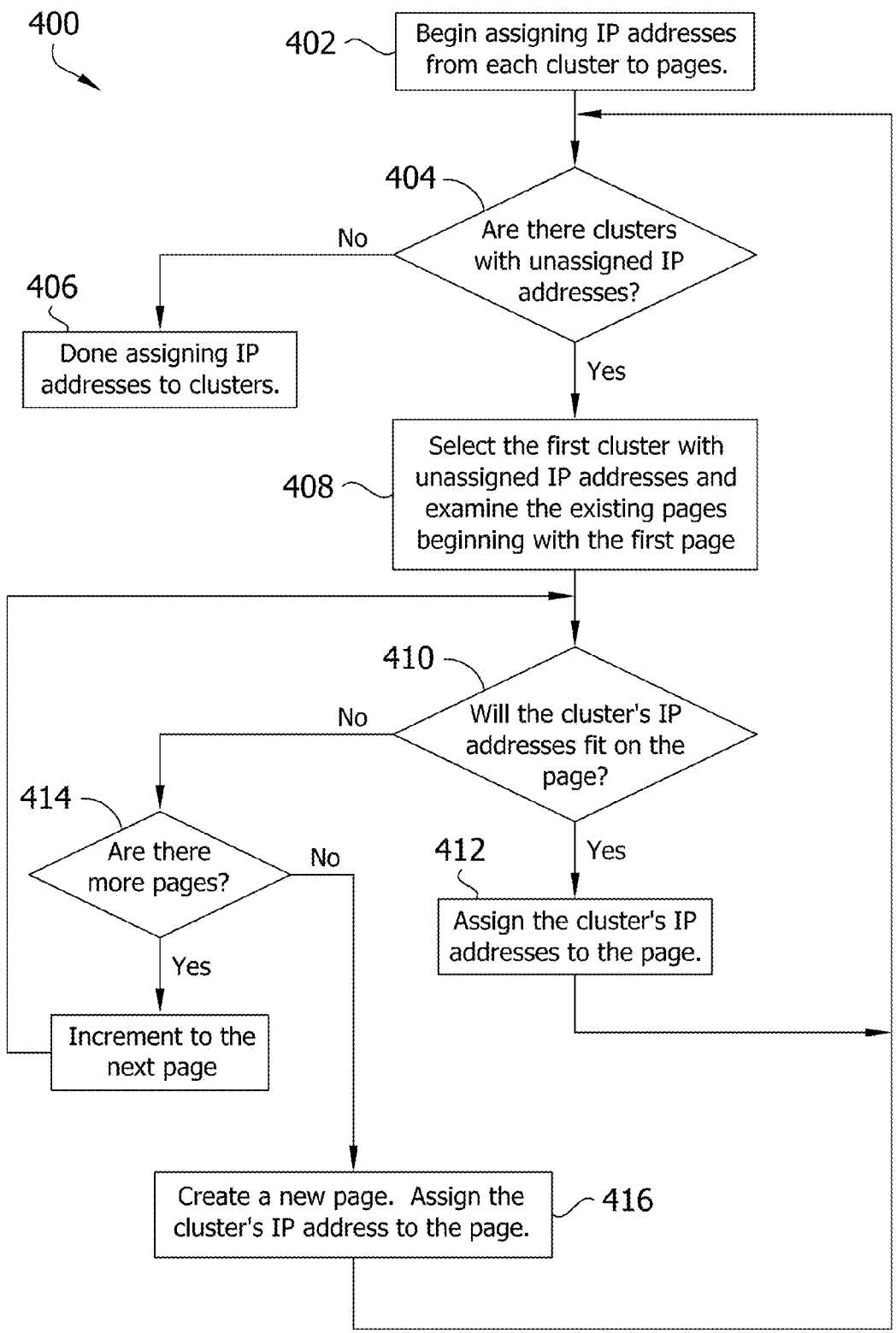
FIG. 4 is a flow diagram illustrating one embodiment of assigning IP addresses from clusters to pages according to a first fit algorithm.

Various implementations of first fit algorithms are appropriate and may be used as part of methods disclosed herein. One example implementation is illustrated by the flow diagram 400 in FIG. 4. When assigned according to a first fit algorithm, for each cluster, the existing pages are searched sequentially, beginning with the first page, to find the first page with enough room to hold the IP addresses in the cluster without exceeding the page size limit. At 402 the process of assigning IP addresses from each cluster to pages begins. At 404 the process determines whether there are any clusters whose IP addresses have not been assigned to pages. If there are no such clusters, at 406, the process is complete. If there are clusters whose IP addresses have not been assigned to pages, the first cluster with unassigned IP addresses is selected at 408 and the existing pages are examined, beginning with the first page. The process may also begin with the last cluster or any other appropriate cluster. In the context of this process, the first page may be the first page by order, the page with the most IP addresses on the page, the page with the least IP addresses on the page, the last page by order, etc. At 410, it is determined whether the cluster's IP addresses will fit on the retrieved page. If it will, the cluster is assigned to that page at 412 and the process returns to 404. If the cluster's IP addresses will not fit on the page, the process continues to 414 to determine if there are more existing pages. If there are no more pages available to examine, a new page is created and the cluster's IP addresses are assigned to that page at 416 and the process returns to 404. If there are additional pages available, the page number to examine is incremented by one, at 418, and the process returns to 410 to determine if the cluster's IP address will fit on the page.

Figure 5:
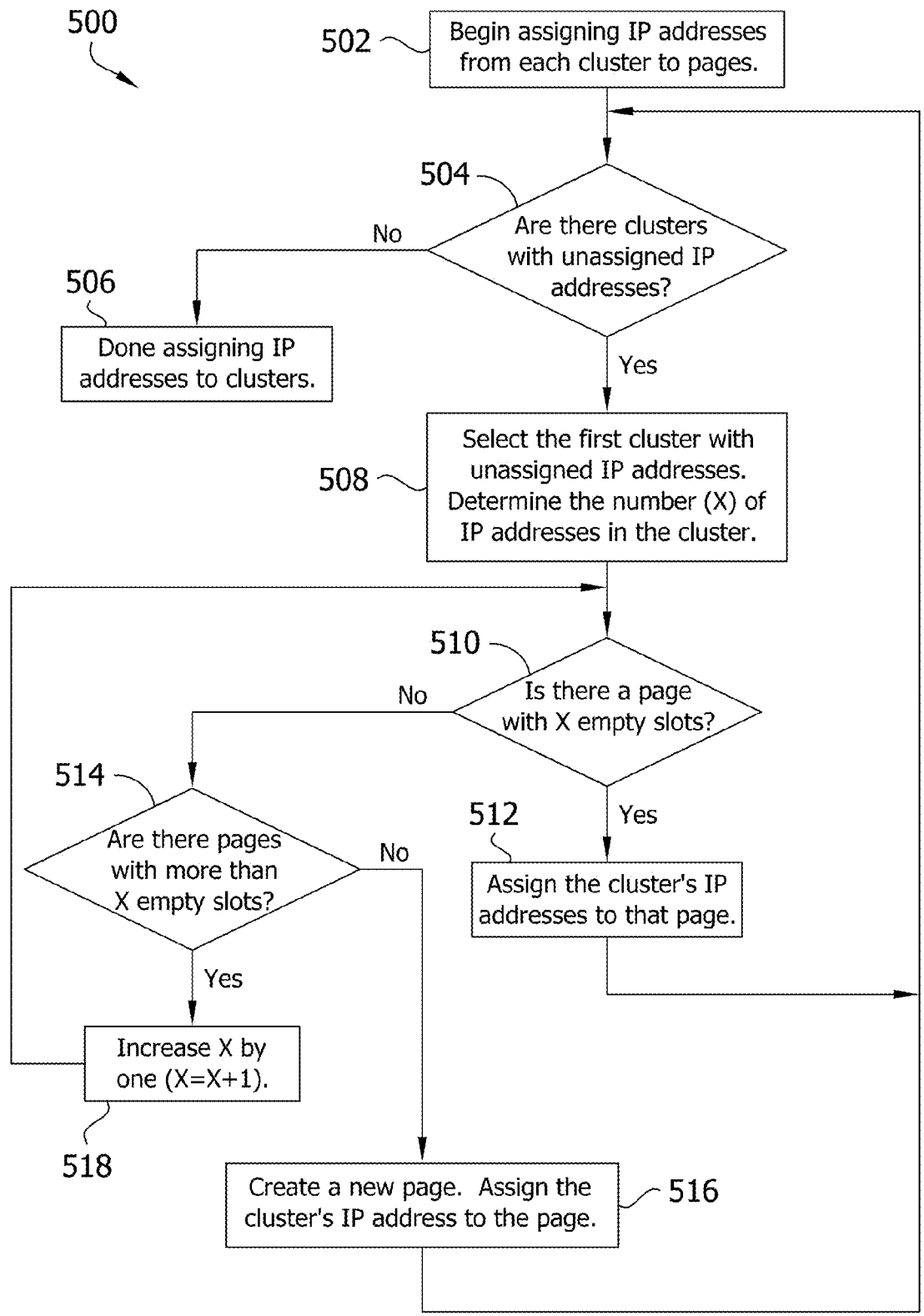
FIG. 5 is a flow diagram illustrating one embodiment of assigning IP addresses from clusters to pages according to a best fit algorithm.

Various implementations of best fit algorithms are appropriate and may be used as part of methods disclosed herein. One example implementation 500 is illustrated in FIG. 5. When assigned according to a best fit algorithm, for each cluster, the existing pages are searched to determine if there is a page with exactly enough room to hold the IP addresses in the cluster without exceeding the page size limit. The process begins at 502. At 504, the process determines whether there are any clusters whose IP addresses have not been assigned to pages. If there are no such clusters, at 506, the process is complete. If there are clusters whose IP addresses have not been assigned to pages, the first cluster with unassigned IP addresses is selected at 508 and the number of IP addresses (referred to in FIG. 5 as X IP addresses) assigned to that cluster (its cluster size) is identified. At 510, the process determines if there is an existing page with X empty slots. The number of empty slots, sometimes also referred to herein as free entries, is the page size limit minus the page size (both expressed in number of IP addresses) and indicates how many more IP addresses may be assigned to that page without exceeding the page size limit. If there is a page with X empty slots, the cluster's IP addresses are assigned to that page at 512 and the process returns to 504. If there is no such page, the process determines at 514. If not, at 516 a new page is created, the cluster's IP addresses are assigned to the new page and the process returns to 504. If there are pages with more than X empty slots, X is increased by one at 518 and the process returns to 510.

The assigning of clusters to pages, whether by best fit, first fit, or any other suitable algorithm, continues until each cluster has been assigned to a page.

According to one embodiment, assignment of IP addresses of the clusters to pages utilizes a cluster list and a page list. As described above, the cluster list contains all clusters and their associated data items. The cluster list is sorted in descending order by the number of entries in each cluster (i.e. the cluster size). A page list is created that will contain pages containing one or more clusters. The page list is sorted by the number of free entries (the page size limit minus the page size) available for each page. Particularly if a first fit algorithm is being used, the page list may be sorted by number of free entries (or empty slots) in ascending order. For each cluster, the cluster is retrieved and the page list is searched for a page that has enough free entries to hold all the IP addresses in that cluster. This search may be according to a first fit algorithm, a best fit algorithm or any other suitable algorithm. If a page is found with enough free entries, the cluster's IP addresses are assigned to the page and the page list is updated to reflect the free entries now remaining on the page. If the page list was ordered by number of free entries, the page list is reordered after each cluster is assigned. If, however, there are no pages with enough free entries, a new page is allocated and the IP addresses of the first cluster are assigned to the page. The page list is updated to indicate the new page and the number of free entries on the new page. The process repeats for subsequent clusters until all clusters have been assigned. According to some embodiments, all clusters that do not include any IP addresses may be assigned to the same page. This page may be page 0, a null page, or any other suitable page. This assignment to a null page may speed up searching the IP addresses. As soon as it is determined that an IP address being search for is in a sub-range associated with a cluster assigned to the null page, the search can be stopped because the null page includes no IP addresses and therefore the searched for IP address is not part of the plurality of IP addresses that have been assigned to the pages.

According to some embodiments, a load factor is determined after all of the clusters have been assigned to pages. The load factor is a ratio of the sum of the page size limit of the plurality of pages to the number of IP addresses in the plurality of IP addresses. The load factor may be considered the ratio of resources used to amount of data stored. It represents the compactness or efficiency of the pages populated with the IP addresses. The lower the load factor the more compact the populated pages are. The more pages used for a given number of IP addresses, the higher the load factor. Similarly, more efficiently populated pages, i.e. pages having page sizes close to or equal to the page size limit when populated with the IP addresses, are more likely to result in fewer pages being needed and the load factor may be reduced. If the methods disclosed herein are utilized the load factor may be very low. The load factor, according to some embodiments, is compared to a load factor threshold. The load factor threshold can vary based on various factors, including desired speed of processing, amount of memory available in a system with which the pages will be used, amount of processing power available in a system with which the pages will be used, etc. According to at least one embodiment the load factor threshold is ten percent. According to at least one other embodiment, the load factor threshold is five percent. If the load factor exceeds the load factor threshold, the pages are not as compact as desired. According to some embodiments, when the load factor exceeds the load factor threshold, the number of clusters is doubled, thereby also decreasing the size of each of the sub-ranges by one-half. The IP addresses are reassigned to the new clusters and the IP addresses in the new clusters assigned to pages according to the methods disclosed above. Because the sub-range of each new cluster is one-half what it was previously, most new clusters will have a smaller cluster size. In many cases, this will permit the clusters to be fit more efficiently into the pages, reducing the unpopulated space in the pages, and decreasing the load factor. If the load factor remains above the load factor threshold, the number of clusters may again be doubled and this iterative process may continue until the load factor is reduced to, or below, the load factor threshold. Alternatively, or additionally, this process may be repeated for a set maximum number of iterations before being stopped. Such maximum number of iterations may be useful to prevent the process from being repeated too many times and creating more clusters than is desired.

After the pages have been populated with IP addresses from the clusters, some of the pages may still have free entries remaining. Accordingly, if one of the pages has a page size less than its page size limit, the method includes duplicating on that page at least one of the IP addresses assigned to that page to increase the page size of that page. In some embodiments, the at least one IP address may be duplicated on the page until the page size is increased to about the page size limit. This duplication of IP addresses to increase the page size to about the page size limit may be referred to sometimes as padding the pages. The at least one IP address may be one IP address, possibly repeatedly duplicated, or it may be multiple IP addresses. The IP address or addresses to duplicate may be randomly selected or specifically selected. For example, only the first IP address in a page may be duplicated on the page, only the middle IP address may be duplicated, the IP addresses may be duplicated in order, a single randomly selected IP address may be duplicated, multiple IP addresses may be randomly selected and duplicated, etc. In at least one embodiment, the at least one IP address is a plurality of randomly selected IP addresses duplicated until the page size is about the page size limit.

The method also includes ordering, for each page, the IP addresses assigned to that page by numeric value. This ordering may make searching the page easier. Additionally, the padding of the pages, the IP addresses of which are then ordered by numeric value, may offer some benefits when the pages are searched. For example, if a page has a page size equal to the page size limit, the number of data elements (i.e. IP addresses) on the page is known. That number of IP addresses is the page size limit. Thus, a table lookup may be used during the searching. The midpoint of the page is a known spot in the page. If a page has 1024 IP addresses, the midpoint of a padded page is the 512th IP address regardless of what the values on the page are and regardless of how many distinct IP addresses are assigned to the page. Additionally, when all pages are so padded and the page size limit of each page is the same, the midpoint of every page is the same. Thus, the midpoint of every page, and accordingly every subsequent midpoint of the portion above or below the midpoint, is a known point, or element, in the page. Particularly using a binary search, sometimes referred to as a divide and conquer search, being able to identify the IP address that is the midpoint without calculation may increase the speed of the search.

According to some embodiments a page record is generated. The page record includes all of the cluster sub-ranges and the page to which the IP addresses in that sub-range are assigned. This data may be arraigned in a tuple of the first numeric value in the sub-range, the last numeric value in the sub-range and the number of the page with which the sub-range is associated. The page record, however, is not so limited and may be implemented using any appropriate method of indicating which sub-range or sub-ranges are associated with each page.

In some embodiments one or more bloom filters may also be created. Bloom filters are a short-circuit. The bloom filter may be used to identify IP addresses that are not in the plurality of IP addresses assigned to the pages without actually searching the pages. A separate bloom filter may be created for each page or a bloom filter may be created for all of the pages. The bloom filter is a bit map having some number of bits, where each bit represents a certain number or combination of numbers. For example, the first bit of a bloom filter may represent the number 0 while the 256th bit represents the number 255. The bloom filter may be mapped to a portion of the IP addresses associated with a page, such as the bits representing the first decimal number, the last decimal number, etc., such that each bit in the bloom filter is associated with one number of the IP address. Alternatively, or additionally, each bit may be mapped to some combination of numbers of an IP address. The combinations of numbers may be the result of a function. Thus, for example, a bloom filter may represent the first two numbers of an IP address exclusive or'd with the last two numbers, or the first number and'd with the last two numbers, etc. Each bit may be set to a 1 or a 0. If a bit is set to 1, an IP address associated with the page includes that bits number. Conversely a bit in the bitmap that is set to 0 indicates that no IP address on the page includes that bits number. By way of example, if the IP address 208.77.188.166 is the only number included on a page, all bits of a bloom filter for the first number of the IP addresses on the page would be zeros except the 209th bit (representing the number 208), which would be set to 1. In use, bloom filters may give false positives (i.e. indicate that a number may be on a page when it is in fact not), but not false negatives (i.e. indicating that a number is not on a page when in fact it is). Continuing the example above, if an IP address to be searched for is 208.70.XXX.XXX, the bloom filter indicates that the IP address may be one of the IP addresses associated with the page (even though it is not in this example). Thus the page would still need to be searched to determine that the address 208.70.XXX.XXX is not an IP address assigned to the page. Conversely, if the IP address to be searched is 192.XXX.XXX.XXX, by simply looking at the 193 bit of the bloom filter the bloom filter indicates, correctly, that the IP address is not one of the IP addresses associated with the page. Because bit 193 is a zero, there are no IP addresses that begin with 192. Accordingly, the page need not be searched. Additionally, a plurality of bloom filters may be used. Each of the plurality of bloom filters is based on a different number, group of numbers, function using the numbers, etc. of the IP addresses. The plurality of bloom filters may be checked sequentially until all bloom filters indicate that the IP address searched is not within any of the pages, until on of the bloom filters indicates the IP address may be in the pages, etc. As can be seen, the use of bloom filters may decrease the amount of time required to determine whether an IP address is present within a plurality of IP addresses processed according to the disclosed methods. This improved performance is particularly notable when a large number of IP addresses to be search for will not and/or are not part of the plurality of IP addresses on the pages.

After one or more of the methods disclosed herein has been performed, the pages containing the IP addresses are ready to be searched. Any combination of searching the pages directly, searching the page record to determine on which page to search and/or using the bloom filter to determine if searching the pages and/or the page record is even necessary may be used. According to some embodiments, the bloom filter is searched first to determine if an IP address is not an IP address associated with one of the pages. If the bloom filter indicates the IP address is not an IP address associated with one of the pages, no further searching may not be necessary. If the bloom filter indicates the IP address may be an IP address associated with one of the pages, the table record may be searched to determine with which page the sub-range encompassing the IP address is associated. After such page is determined, the page itself is searched to determine whether the IP address is one of the IP addresses assigned to such page.

Figure 6:
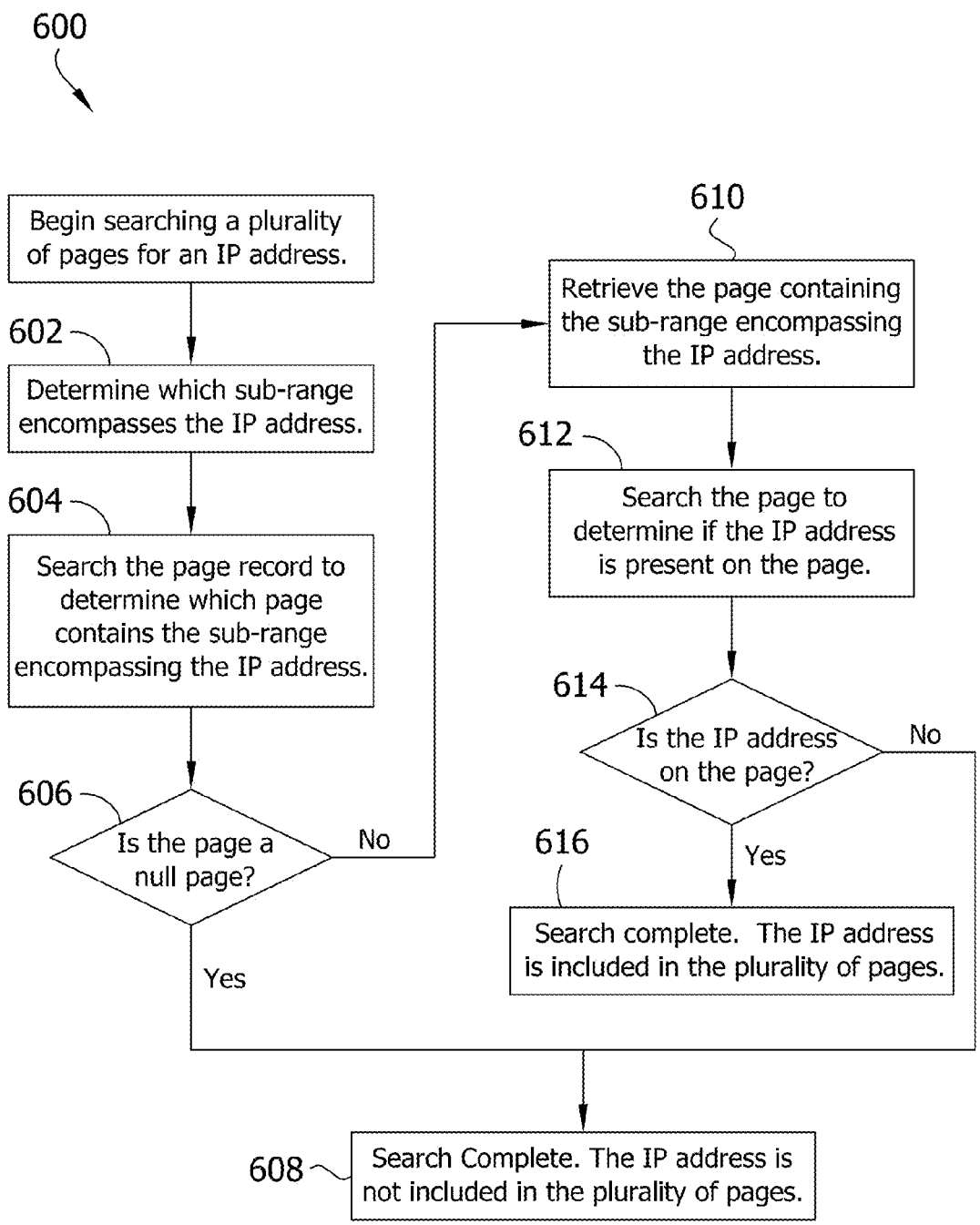
FIG. 6 is a flow diagram illustrating one embodiment of searching to determine if an IP address is one of a plurality of IP addresses assigned to pages according to the present disclosure.

FIG. 6 illustrate one example process 600 for searching to determine if an IP address is one of the plurality of IP addresses. In this example, a page record and a null page are used, but no bloom filter is used. At 602, the sub-range that encompasses the IP address is determined. The page record is searched at 604 to determine which page contains the sub-range encompassing the IP addresses. At 606, whether the page returned by the search in 604 is a null page is determined. If the returned page is a null page, the search is complete at 608 and the IP address is not one of the plurality of IP addresses. If the returned page is not a null page, the process continues to 610 and the returned page is retrieved. The page is then searched for the IP address at 612. If, at 614, the IP address is not on the page, the process is complete at 608 and the IP address is not one of the plurality of IP addresses. If the IP address is on the page, the search is complete at 616 and the IP address is one of the plurality of IP addresses.

The searching according to embodiments discussed herein may be any appropriate method of searching for a data item. For example the search may be a binary search (sometimes referred to as a binary divide and conquer search), a linear search, an interpolation search, a search as described in co-owned U.S. patent application Ser. No. 11/591,802 (now U.S. Pat. No. 8,077,708), etc. The entire disclosure of the above-referenced application is incorporated herein by reference for all purposes Additionally, or alternatively, the pages created by the methods described herein and/or the page record may be combined with appropriate instructions to create an engine for determining whether an input IP address is contained in the plurality of IP addresses processed according to the methods described above. The engine includes the pages with their assigned IP addresses, instructions operable to cause a processor to search the pages, and a finite state machine (FSM). The engine may sometimes be referred to as a pre-compiled exception list engine. The FSM includes the page record and instructions operable to cause a processor to search the page record and output an indication of which, if any, page will contain the input IP address if it is present. When an IP address is input to the engine, the FSM searches the page record to identify on which page the sub-range encompassing the input IP address is located and outputs an identifier of that page. The appropriate page is then searched to determine whether the IP address is located on the page. The engine then outputs a yes or no answer, for example a 1 or a 0, indicating that the input IP address is or isn't, respectively, one of the plurality of IP addresses. Some or all of the items discussed above, such as, for example bloom filters, may also, or alternatively, be included in the engine.

Figure 7:
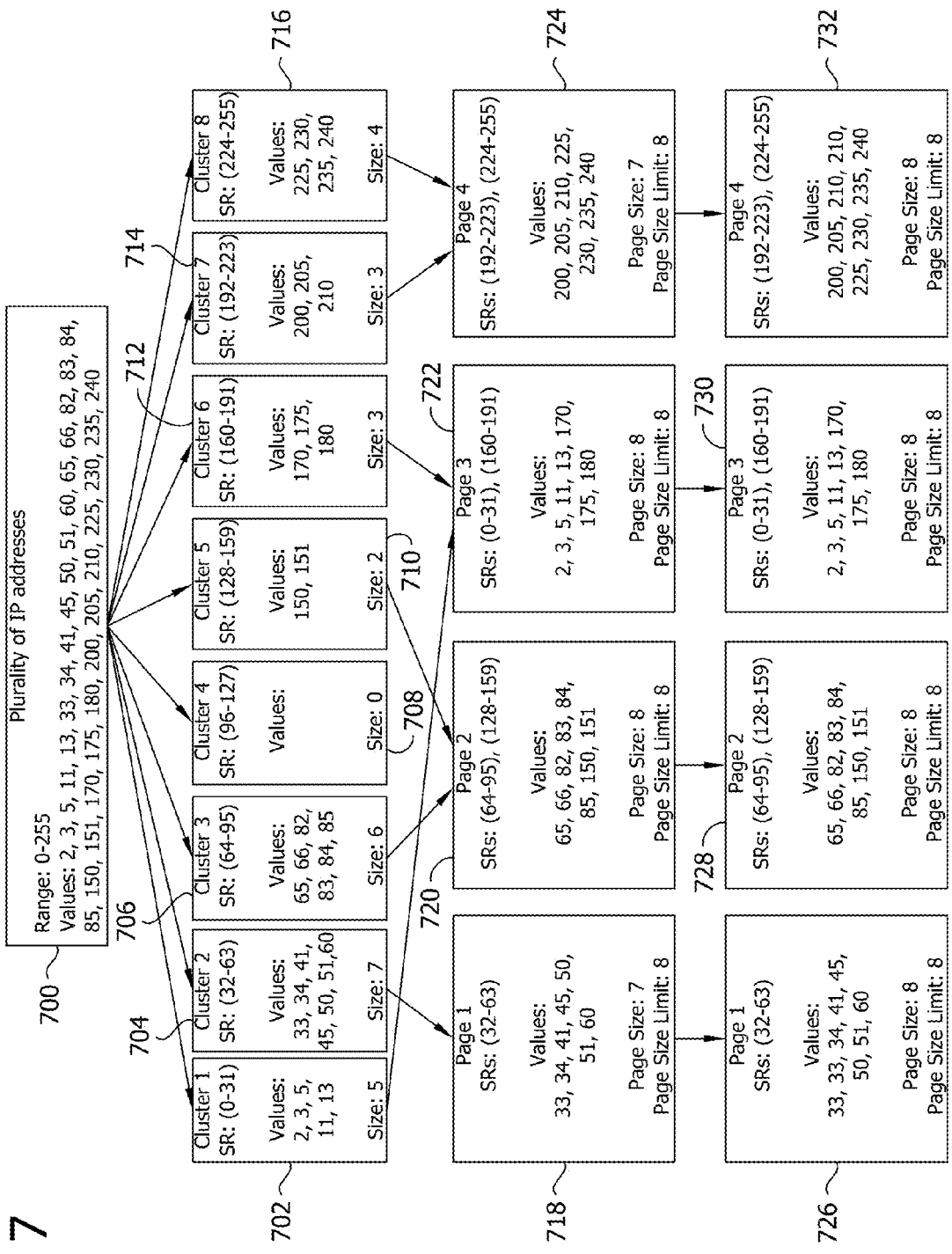
FIG. 7 is a graphical representation of an example application of a method for sorting a plurality of IP addresses.

A simplified example of the use of the methods described herein will now be described with reference to FIG. 7. For simplicity the some intervening steps are not illustrated and will only be described. For this example, the plurality of IP addresses 700 will be represented by a set of thirty numbers within a range which is the set of eight bit integers (i.e., all numbers are between 0 and 255, inclusive). Each number therefore, will have a size of eight bits. The page size limit for this example is eight IP addresses (or 64 bits). Thus, each cluster can have no more than eight IP addresses assigned to it. A load factor threshold of 1.5 will be used for this example.

For sake of example, the range is initially divided into only two clusters. Each cluster has a sub-range of one half the range. The IP addresses are assigned to the clusters as discussed above. As is apparent, however, there is no way thirty IP addresses can be assigned to two clusters without at least one cluster including more than eight IP addresses. Therefore, the number of clusters is doubled and the size of the sub-ranges decreased by one-half. At this point there are four clusters. The IP addresses are assigned to them as discussed above. The result is a first cluster with a sub-range of (0-63) having twelve IP addresses (2, 3, 5, 11, 13, 33, 34, 41, 45, 50, 51, 60) assigned to it. A second cluster has a sub-range of (64-127) having six IP addresses (65, 66, 82, 83, 84, 85) assigned to it. A third cluster has a sub-range of (128-191) having five IP addresses (150, 151, 170, 175, 180) assigned to it. Finally, a fourth cluster has a sub-range of (192-255) having seven IP addresses (200, 205, 210, 225, 230, 235, 240) assigned to it. The first cluster still contains more than the page size limit of eight IP addresses and will not fit on a page. Therefore, the number of clusters is again doubled and the size of the sub-ranges is again decreased by one-half. The IP addresses are reassigned to the new clusters. The result is eight clusters 702-716. Each cluster 702-716 has a sub-range size of thirty-two possible IP addresses. The sub-range of each cluster 702-716 is indicated by SR in FIG. 7. The values of the IP addresses assigned to each cluster 702-716 are also indicated within the cluster. Finally, the cluster size (labeled as "Size" in each cluster 702-716), for each cluster is indicated. For example, the first cluster 702 has the sub-range 0 to 31. The IP addresses assigned to the cluster 702 are (2, 3, 5, 11 and 13). Thus, the first cluster has a cluster size of five.

Because each cluster 702-716 now has a cluster size less than or equal to the page size limit, the IP addresses in each cluster may be assigned to pages 718-724. The clusters are sorted in descending order according cluster size. Accordingly, the first cluster is cluster 704, having a cluster size of 7, and the last cluster is cluster 708, having a cluster size of 0. In this example, the clusters are assigned according to a first fit algorithm. Beginning with the largest cluster, cluster 704, a page with enough room to hold all of the IP addresses of cluster 704 is searched for. There are no pages to begin with and, therefore, no page with at room for at least seven IP addresses. Accordingly, a page 718 is created and the IP addresses from cluster 704 are assigned to it. The next largest cluster 706 has a cluster size of six. As the page size limit is eight and there are already seven IP addresses assigned to the first, and at this point only, page 718, there is not enough room on any existing page for the IP addresses of cluster 706. Thus, a second page 720 is created and the IP addresses from cluster 706 are assigned to the page 720.

Similarly, neither the first page 718, nor the second page 720 has sufficient free entries to hold the IP addresses of the next largest cluster 702. A third page 722 is, therefore, created and the IP addresses of the cluster 702 are assigned thereto. Again, none of the pages 718, 720 or 722 have enough free entries to hold the four IP addresses of cluster 716. A fourth page 724 is created, to which the IP addresses of the cluster 716 are assigned. The next to be assigned is cluster 712, with a cluster size of three. Neither the first page, nor the second page has enough room for the three IP addresses of cluster 712. The third page 722 however, only contains five IP addresses of the eight that it can hold. Therefore, the IP addresses of cluster 712 can be, and are, assigned to the third page 722. When the next cluster 714 is assigned, the fourth page 724 is the first page having enough free entries to hold the IP addresses of cluster 714. At this point the first page 718 has one free entry, the second page has two free entries, the third page has zero free entries and the fourth page has one free entry. Cluster 710 is the next largest cluster with two IP addresses. The first one of the pages 718-724 that can hold the IP addresses in cluster 710 is the second page 720, to which the IP addresses are assigned. The last cluster 708 has no IP addresses and a cluster size of zero. The cluster 708 is, therefore, assigned to a null page (which may be page zero), indicating that it includes no IP addresses. All IP addresses in the clusters 702-716 have now been assigned to pages 718-724.

A load factor may be calculated at this point. As discussed above, the load factor is the ratio of the sum of the page size limits to number of IP addresses in the plurality of IP addresses (or alternatively, but equivalently, to the sum of the page sizes). In this example, the page size limit is eight. The sum of the page size limits therefore is thirty-two. The sum of the page sizes and the number of IP addresses in the plurality of IP addresses 700 is thirty. Thus, the load factor is 32/30 or 1.067. This load factor is acceptable (i.e. it is below the load factor threshold of 1.5). If the load factor were above the load factor threshold, the number of clusters would be doubled again as discussed above and the entire process discussed above is repeated again until the load factor is below the load factor threshold.

The IP addresses assigned to each page 718-724 are next sorted in numerical order. The first page 718 and the fourth page 724 have page sizes (seven in both cases) less than the page size limit of eight. For each page 718, 724 a random IP address is chosen from the IP addresses assigned to that page 718, 724 and duplicated on that page 718, 724. For this example, thirty three was duplicated on first page 718, and two hundred ten was duplicated on the fourth page 724. The result is four pages 726-732 each having a page size equal to the page size limit of eight.

Either after the IP addresses have been assigned to the pages 726-732 or while the IP addresses are being assigned to pages 718-724, a page record may be created. The page record indicates each of the sub-ranges of the clusters 702-716 (typically by starting value and ending value) and the page to which the IP addresses encompassed by that sub-range were assigned. The page record can consist of a tuple for each sub-range formatted as (start value, end value, page number). Thus, the page record for this example would be: (0,31,3); (32,63, 1); (64,95,2); (96,127,0); (128,159,2); (160,191,3); (192,223,4); (224,255,4). The plurality of IP addresses 700 may now be searched using the pages 726-732 and the page record as discussed above and/or an engine generated for searching the plurality of IP addresses.

Although primarily discussed in terms of internet protocol (IP) addresses, the methods disclosed herein is not so limited and may be applied to other types of data. For example, the methods may be applied to data such as street addresses, social security numbers, driver's license numbers, bank check numbers, etc.

Because of the speed at which very large set of IP addresses may be searched according to the methods presented herein, one use for such methods is in connection with network devices (also sometimes referred to as appliances). These devices, including appliances such as firewalls, routers, servers, etc., may receive packets of data from a first network and process the packets of data. The processing may include processing internal to the appliance (such as, for example, allowing the packet to cause an application to run on the appliance, cause the appliance to transmit data, files, etc. back to the computer originating the packet, etc.) and/or may include passing the packets to a second network. These devices may include rules, policies, etc., for whether to allow certain packets to be processed or to enter the second network. For example, a firewall may be located between a network and the internet. The firewall may wish to block packets originating from and/or addressed to certain IP addresses. These IP addresses may be the IP addresses of known spammers, hackers, foreign governments, etc. Alternatively, or additionally, these appliances may wish to block all packets except those originating from certain known IP addresses and/or process packets from certain IP addresses differently (such as, for example, prioritizing transmission of the packets, limiting bandwidth, etc.).

Figure 8:
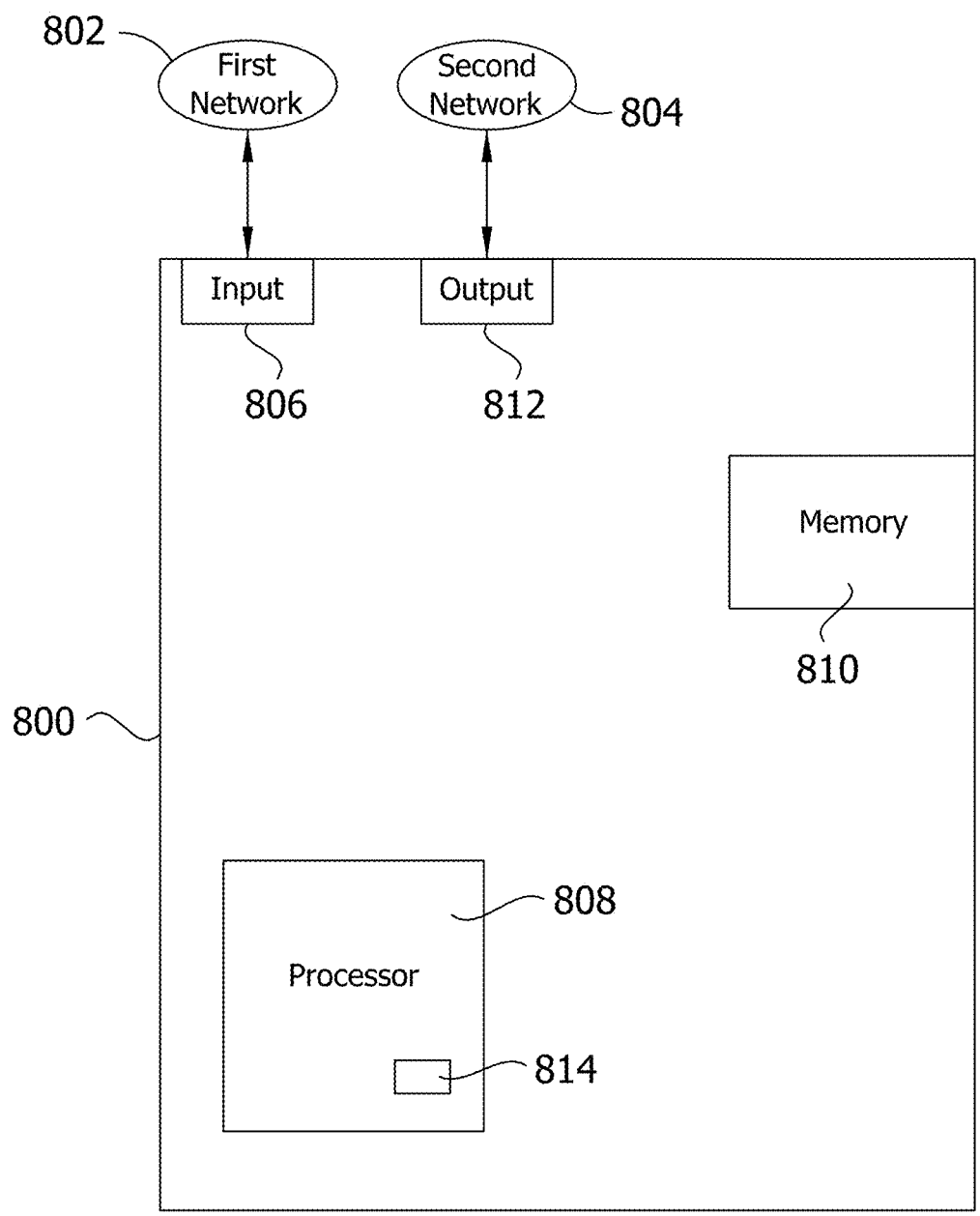
FIG. 8 is a network appliance for connection between two networks and incorporating aspects of the methods disclosed herein.

Thus, according to one aspect of the present disclosure, and as illustrated in FIG. 8, a network appliance 800 for connection to a first network 802 is disclosed. The appliance 800 includes at least one input 806 coupled to the first network 802 for receiving a packet from the first network 802. The packet includes an internet protocol (IP) address. The appliance 800 also includes at least one processor 808 for determining whether to allow the packet from the first network 802 to proceed and at least one memory device 810 storing instructions and data. The data includes a plurality of pages storing a plurality of excepted IP addresses. The excepted IP addresses each has a numeric value within a range. The range is divided into a plurality of contiguous sub-ranges and each page includes one or more of the excepted IP addresses having numeric values within one or more of the sub-ranges associated with that page. Each page has a page size defined by the number of IP addresses assigned to that page. The excepted IP addresses are assigned to each page ordered by numeric value. The at least one processor 808 is configured via the instructions to identify the IP address of the packet from the first network 802, identify a target page that will include the IP address if the IP address is one of the plurality of excepted IP addresses, search the target page to determine if the IP address is one of the excepted IP addresses in the target page, and process the packet from the first network 802 according to whether the IP address is an excepted IP address in the target page.

The processing the packet according to whether the IP address is an excepted IP address may include processing internal to the appliance 800 and/or may include passing the packets to a second network 804. If the processor 808 determines to allow the packet to proceed, processing internal to the appliance 800 may include allowing the packet to cause an application to run on the appliance 800, allowing the packet to cause the appliance 800 to transmit data, files, etc. back to the computer originating the packet, etc. Thus, for example, the appliance may be a Web server, network server, etc. that may determine whether to allow a remote user to access a webpage, run a program stored on the server, view/download files stored on the server, etc. The appliance 800 may also include at least one output 812 coupled to a second network 804 for transmitting the packet from the first network 802 to the second network 804 if the processor 808 determines to allow the packet from the first network 802 to enter the second network 804.

According to another aspect of the present application, a network appliance 800 for connection to a first network 802 includes at least one input 806 coupled to the first network 802 for receiving a packet from the first network 802. The packet includes an internet protocol (IP) address. The appliance 800 includes at least one processor 808 for determining whether to allow the packet from the first network 802 to proceed and at least one memory device 810. The appliance 800 also includes a first engine stored in the memory device 810. The first engine includes a plurality of pages storing a plurality of excepted IP addresses. The excepted IP addresses each has a numeric value within a range of numeric values and the range is divided into a plurality of contiguous sub-ranges. Each page includes one or more of the excepted IP addresses having numeric values within one or more of the sub-ranges associated with that page. Each page has a page size defined by the number of excepted IP addresses assigned to that page. The excepted IP addresses are assigned to each page ordered by numeric value. The first engine also includes a first finite state machine (FSM). The first FSM includes instructions executable by the processor 808 to determine the page associated with the sub-range encompassing the IP address. The engine includes instructions operable to cause the processor to search the page associated with the sub-range encompassing the IP address to determine if the IP address is an excepted IP address and output an indication of whether the IP address is an excepted IP address. The processor 808 is also configured via instructions stored in the memory device 810 to process the packet from the first network 802 according to the indication from the first engine.

The processing of the packet according to the indication from the first engine may include processing internal to the appliance 800 and/or may include passing the packets to a second network 804. If the processor 808 determines to allow the packet to proceed, processing internal to the appliance 800 may include allowing the packet to cause an application to run on the appliance 800, allowing the packet to cause the appliance 800 to transmit data, files, etc. back to the computer originating the packet, etc. Thus, for example, the appliance may be a Web server, network server, etc. that may determine whether to allow a remote user to access a webpage, run a program stored on the server, view/download files stored on the server, etc. The appliance 800 may also include at least one output 812 coupled to the second network 802 for transmitting the packet from the first network 802 to the second network 804 if the processor 808 determines to allow the packet from the first network 802 to enter the second network 804 via processing the packet according to the indication from the first engine.

The processor 808 may include cache memory 814. As discussed above, cache memory resides on the processor 808. Accessing, manipulating, acting upon, etc. data occurs much quicker when the data is stored in cache memory 814 than when it is stored in separate memory, such as memory device 810. For this reason, it may be preferable to have the page size limit of each page be selected such that the entire page will fit in the cache memory 814.

According to various embodiments, the excepted IP addresses may be IP addresses to be allowed entry to the second network, denied entry to the second network, and/or specially processed. Thus, in some embodiments, if a packet's IP address is an excepted address, the packet is prevented from entering the second network. In other embodiments, if a packet's IP address is an excepted address, the packet is allowed to enter the second network. In still other embodiments, if a packet's IP address is an excepted address, the packet is specially processed, such as being prioritized, rerouted to a different destination (whether within or without the second network), etc. The appliance 800 may operate with two or more sets of pages and page records and/or more than one engine as described above. For example, one engine may include pages having excepted IP addresses that are to be blocked, while a second engine includes excepted IP addresses to be allowed. There may also be more than one engine with one type of excepted IP address (e.g., blocked, allowed, special, etc.). Thus, a first engine may include excepted IP addresses of known hackers, while another engine includes excepted IP addresses of known spammers. Although only two engines are described above, there may be more than two. The engines, when there is more than one, may be prioritized in any appropriate manner. As one example, if an IP address is found by one engine (A), the appliance may restrict bandwidth available to packets from that IP address. IP addresses found by another engine (B) may be given high priority and increased bandwidth. If the IP address of an incoming packet is found by both engine (A) and engine (B), the appliance may need to apply priority rules to determine how to handle the packet. For example, engine (B) may be given highest priority and the packet may be given priority, or engine (A) may be given the higher priority and packets from the IP address will be permitted limited bandwidth. Additionally, or alternatively, more complex rules of priority may apply (such as A prioritized over B except when D is also true, etc.).

In various embodiments some or all of the elements of the method discussed above may be incorporated in or used with the appliance 800. Thus, for example, the data may include a page record. The processor 808 may be configured by the instructions to identify the target page by searching the page record. The processor 808 may be configured by the instructions to determine that there are no excepted addresses in the sub-range encompassing the IP address by searching the page record. The data may also include a null page associated with any sub-range encompassing no excepted addresses.

In one example embodiment, the appliance 800 is used by setup by a user (sometimes referred to as an administrator). The user may perform the method discussed above on a computer that is not the appliance 800. The page size limit should be selected such that an entire page will fit within the cache memory 814 of the appliance's 800 processor 808. The resulting pages and page records, or the resulting engines are then uploaded to the appliance 800 and stored in the at least one memory device 810. Alternatively, or additionally, the method may be performed within the appliance 800 itself if the appliance 800 has enough memory, processing power, etc. When operating, packets from the first network have their IP addresses fed to the engines before being allowed to enter the second network. As discussed above, the engines will perform the searching and output an indication of whether the IP address of the packet is in the pages of the engine (i.e., whether it is an excepted IP address). Depending on the result and the configuration of the appliance 800, the appliance 800 may allow, block, specially treat, etc. the packet, it may apply some other action to the packet (such as scanning it, copying it, etc.), or it may input the IP address to another engine. Alternatively, or additionally, the IP address of the packet may be simultaneously input to two or more engines (i.e., parallel processed).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Internet Protocol Threat Prevention

Aspects of the invention permit blocking high-risk IP connections in real-time based on IP threat information while allowing users to tailor their acceptable risk profiles to match the security requirements of their network resources. IP threat information provides details relating to potentially high-risk IP addresses. This information includes, at least in part, an IP address, a named risk category, and a risk score corresponding to a confidence level that the associated IP address is actually a threat within the named category. It is contemplated that additional information relating to the IP address may be included. In an embodiment, IP threat information is acquired from one or more providers (e.g., IRIPs) via a real-time feed based on an encoding format, such as XML or JSON, across a communications network. In another embodiment, IP threat information is acquired from a computer-readable storage medium.

Figure 9:
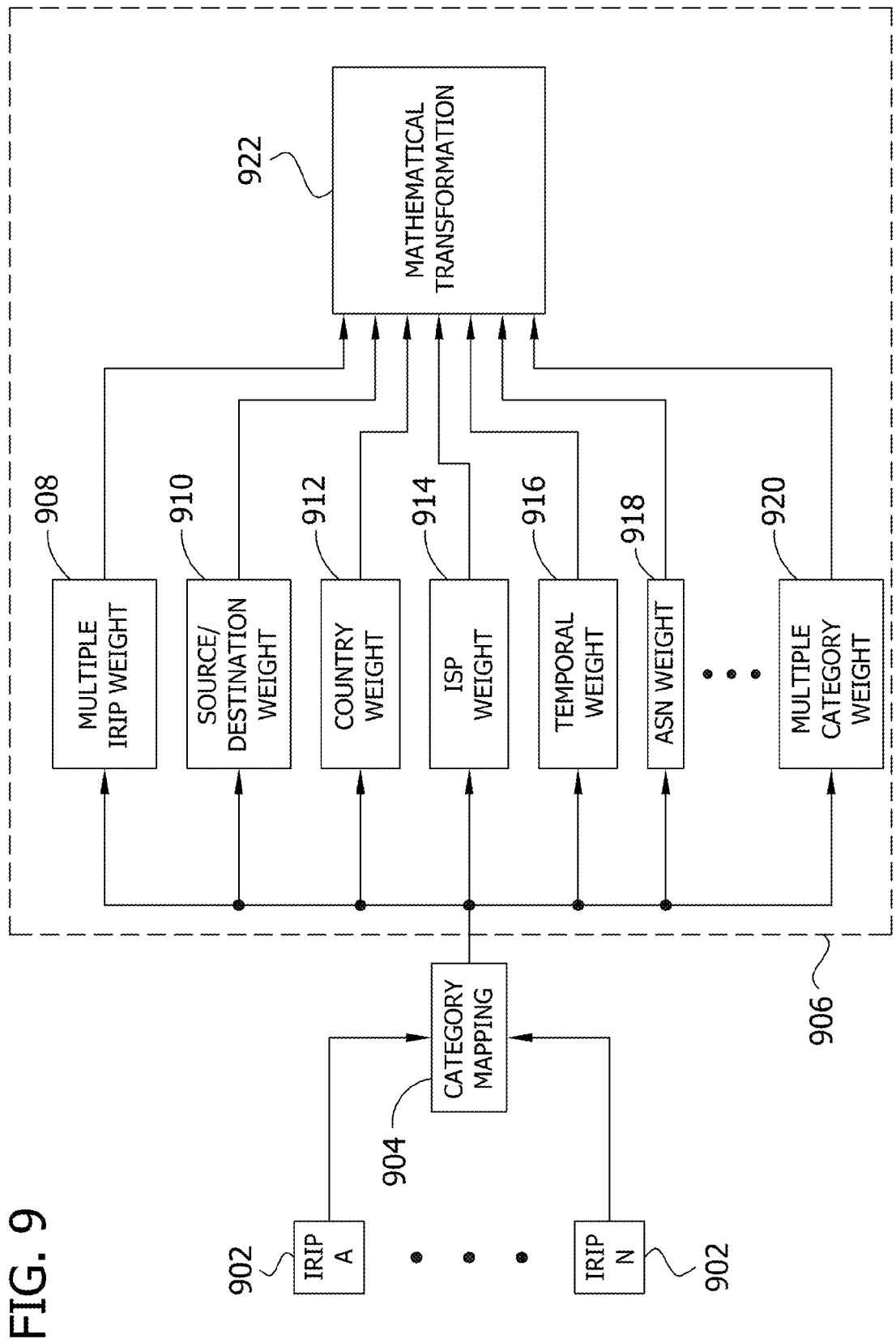
FIG. 9 is a diagram of an exemplary threat assessment process in accordance with an embodiment of the invention.

FIG. 9 illustrates a process for assessing threats embodying aspects of the present invention. In accordance with aspects of the present invention, the process assigns weights to various characteristics associated with an IP address and adjusts a risk score for the IP address by using a mathematical transformation.

In an embodiment of the present invention, the risk category names are mapped into a set of common category names. As shown in FIG. 9, IP threat information is acquired from a plurality of IRIPs 902 and the named risk category provided by each IRIP is mapped into a common category name at 904. For example, attackers commonly hide their identities on the Internet through the use anonymous proxies (i.e., anonymizers), which makes Internet activity untraceable. Different IRIPs may label an IP address associated with a named risk category differently, depending upon individual naming conventions. For example, different IRIPs may label an IP address from an anonymizer as a "Tor Node," a "Tor Exit Node," or a "Tor Anonymizing Node." To create a common taxonomy, each of the IRIP category names are mapped to a common category name, for example, a "Tor node." As another example, IRIPs may use category names such as "Anonymizer node," "Proxy node," and "Relay node," which could be mapped to "Proxy node." Mapping the different category names from different IRIPs into one common category avoids problems with naming conventions or spelling issues within a given category. Exemplary categories may include, but are not limited to "Command and Control Sever," "Known Infected Bot," "Known spam Source," "Tor Node," "Known Compromised or Hostile Host," "Proxy Host," "Host Performing Scanning," "SSH or other brute forcer," "Fake AV and AS products," "Distributed Command and Control Nodes," "Suspicious exe or dropper service," "Mobile CnC," and "Mobile Spyware Cnc."

Preferably, the IP threat information mapped at 904 is stored in a local database. In an embodiment, a timestamp (e.g., the date and time) of acquisition of the IP threat information is stored in the local database with the IP threat information. The date and time may be used for aging out entries. As time passes without additional information about a particular IP address, the certainty of that particular IP address being a high risk diminishes. For example, an IRIP may list a particular IP address as a high risk consistently over a pre-determined period of time. That particular high-risk IP address may warrant an assignment of a higher weighting value compared to other high-risk IP addresses that are not consistently ranked as a high risk.

Referring further to FIG. 9, a Risk Assessment Mitigation Processor (RAMP) engine 906 assigns weights for various characteristics associated with the IP address. Exemplary characteristics for which weights are assigned include, but are not limited to, multiple IRIP characteristics 908, source and/or destination characteristics 910, originating country characteristics 912, originating ISP characteristics 914, temporal characteristics 916, an autonomous system number (ASN) characteristics 918, and multiple category characteristics 920. As explained in greater detail below, after the various weighting factors have been assigned to the IP address, the weighted values are then used by a mathematical transform 922 (e.g., a linear transform, an exponential transform, or a logarithmic transform) to apply an adjustment to the risk score. Based on one or more of the weighted risk category values, aspects of the invention render a decision or otherwise determine an action. Exemplary actions include a decision to allow traffic, re-route the traffic, allow the traffic but make a record of it, etc.

Figure 10:
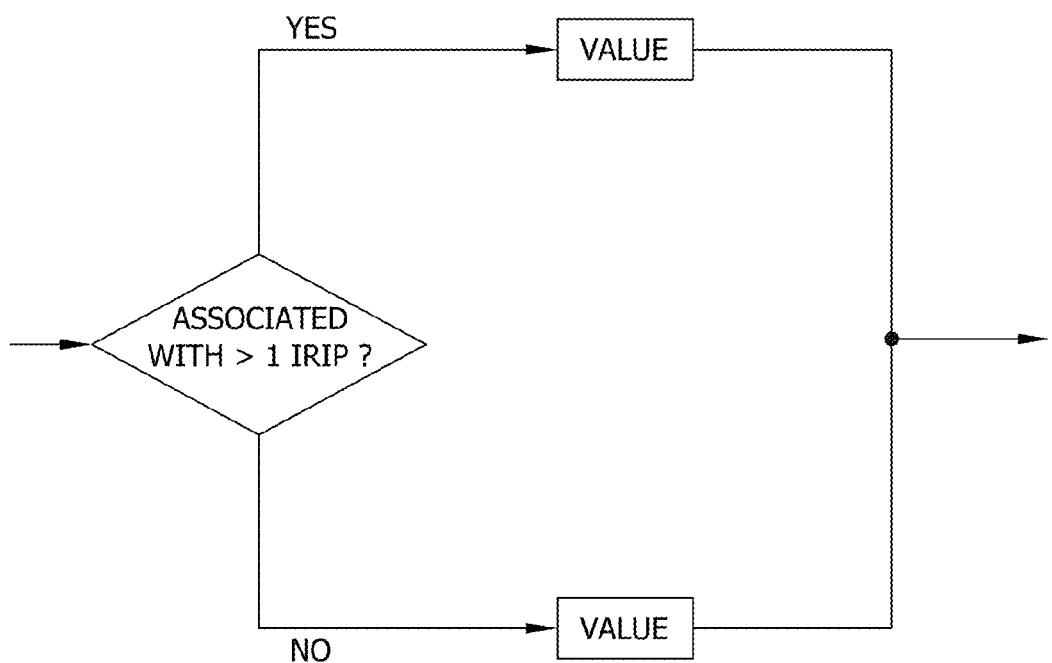
FIG. 10 further illustrates an exemplary weighting process for multiple IRIP characteristics of FIG. 9.

FIG. 10 further illustrates the weighting process for multiple IRIP characteristics 908. In an embodiment, each IP address that is acquired from multiple IRIPs is assigned a weighting factor value that has a greater weighting factor value compared to a weighting factor value assigned to an IP address associated with a single IRIP.

Figure 11:
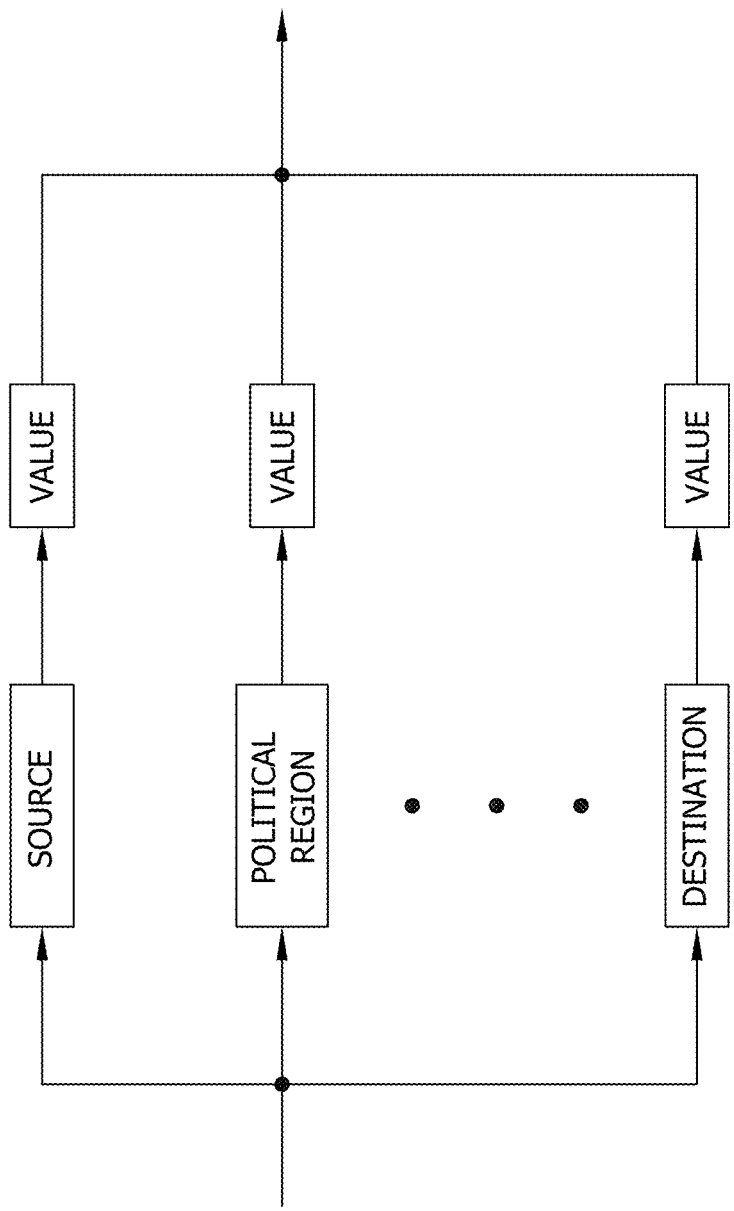
FIG. 11 further illustrates an exemplary weighting process for source and/or destination characteristics of FIG. 9.

FIG. 11 further illustrates the weighting process for source and/or destination characteristics 910. A weighting factor in this embodiment is applied to take into account the risk associated with connections to IP addresses originating (i.e., inbound or source) or going to (i.e., outbound or destination) certain regions. Examples of regions include, but are not limited to geographical areas, such as countries, business sectors, political divisions, and the like. For instance, an IP address originating in China may have a higher risk than an IP address originating in Canada. In addition, an IP address from a regulated industry, such as financial or critical infrastructure, may be less likely to pose a risk than an IP address from, for example, the entertainment or real-estate industry. Further, connections from a political group that strongly supports pornography or other unfavorable subjects would be more likely to be the target of an attack by cyber activists, and would be more likely to be infected than an IP address from a political group that supports religious freedom or other favorable subjects.

The weighting process of FIG. 11 combines source and/or destination weight with the risk score provided by each IRIP provider to derive a weighted risk score that takes into account where the connection originates from (inbound) or terminates at (outbound). In the outbound (i.e., destination) case, for example, malware may be resident on a computer and running unnoticed in the background. When the malware sends information to an IP address, the risk score of the destination IP address is compared against the established acceptable level and the connection is dropped if the score exceeds the maximum acceptable risk level.

Moreover, in an embodiment the source and/or destination weighting factor takes into account geographic proximity instead of or in addition to country filtering. Geographic proximity relates to how close the IP address is to other IP addresses that are listed as high-risk. This method is not the same as country filtering, although there may be some overlap between the two methods. This technique uses mathematical formulas to determine the proximity of a potentially high-risk IP address to the nearest cluster of high risk IP addresses. The distance to the cluster is combined with the weighted threat score of the cluster to determine the risk for the IP address not associated with the cluster. The closer the IP address is to the cluster, the higher the risk score assigned to the IP address. Beneficially, this geographic proximity method provides better results when the cluster and the IP address are close in proximity, but in different countries, such as near the border. For example, an IP address located 10 miles from Blaine, Wash., could be associated with clusters located in neighboring cities such as Seattle, Wash., United States or Vancouver, British Columbia, Canada. If the cluster is located in Seattle and the IP address is located in White Rock, British Columbia, Canada, it would not be listed as a threat when a country filter (e.g., the United States) is utilized. However, by using geographic proximity, the existence of the United States-Canada border between the cluster and the IP address is irrelevant and the IP address would be a higher threat risk given its proximity to the cluster located in Seattle.

Figure 12:
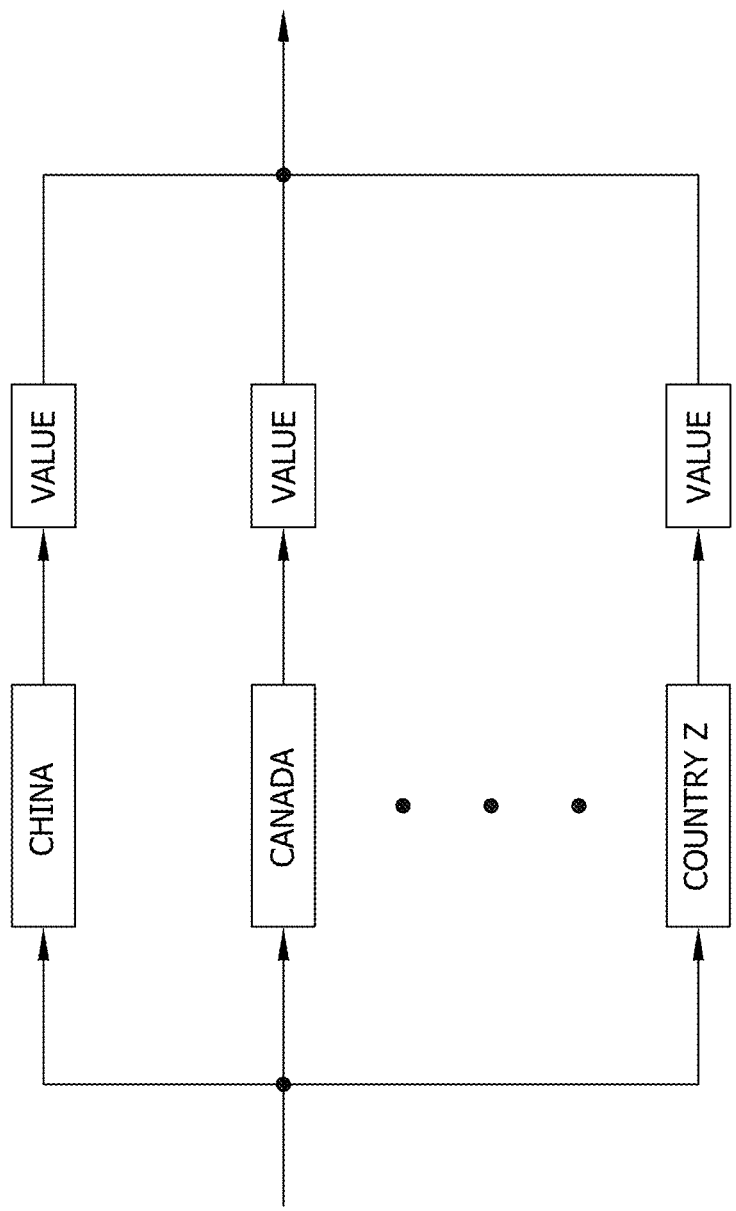
FIG. 12 further illustrates an exemplary weighting process for originating country characteristics of FIG. 9.

FIG. 12 illustrates the weighting process for originating country characteristics 912 according to an embodiment of the invention. For instance, in assigning a weight to an IP address originating from a particular country, the RAMP engine 906 assigns a greater weighted value to an IP address originating from a higher risk country, such as China, compared to an IP address originating from a lower risk country, such as Canada.

Figure 13:
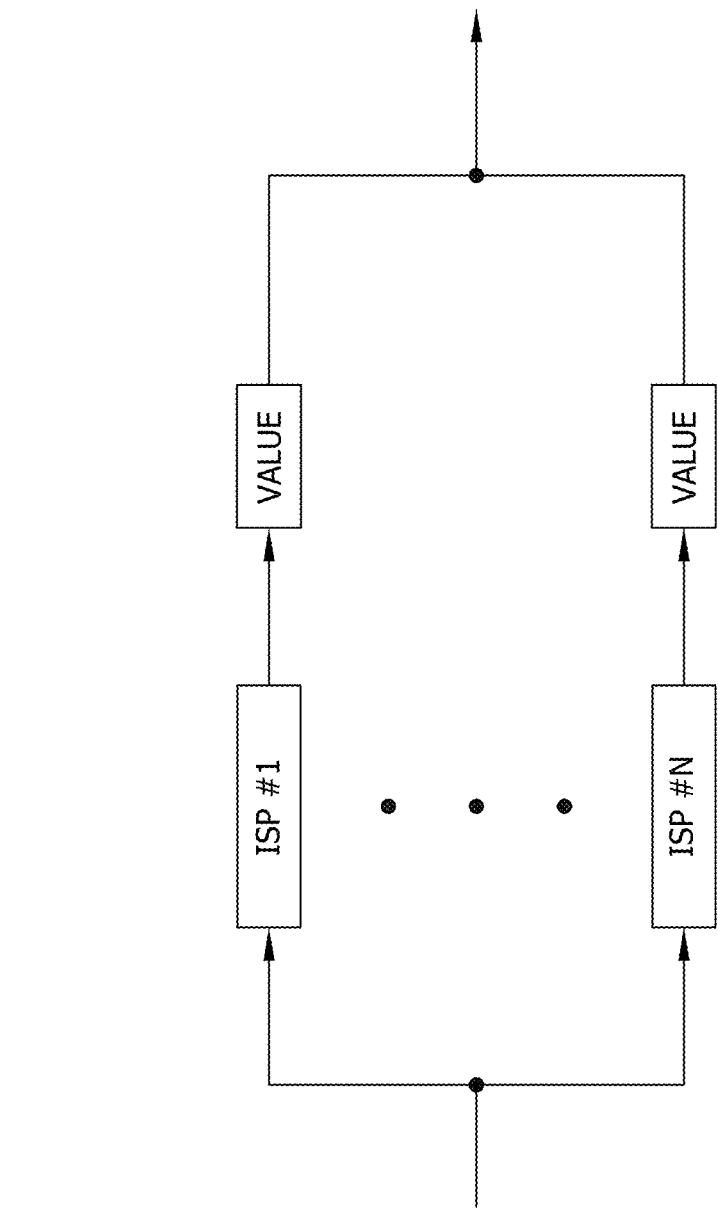
FIG. 13 further illustrates an exemplary weighting process for originating ISP characteristics of FIG. 9.

In FIG. 13, the weighting process for originating ISP characteristics 914 embodying aspects of the invention considers the ISP's threat experience. For example, RAMP 906 may take into account the risk associated with connections originating from a particular ISP that has a high number of IP addresses that consistently appear on IP threat feeds, which indicates that the ISP does not enforce adequate restrictions preventing its IP address space from being used for a malicious purpose. Therefore, the ISP is weighted according to, for example, its reliability to assess a particular IP address as a threat.

Figure 14:
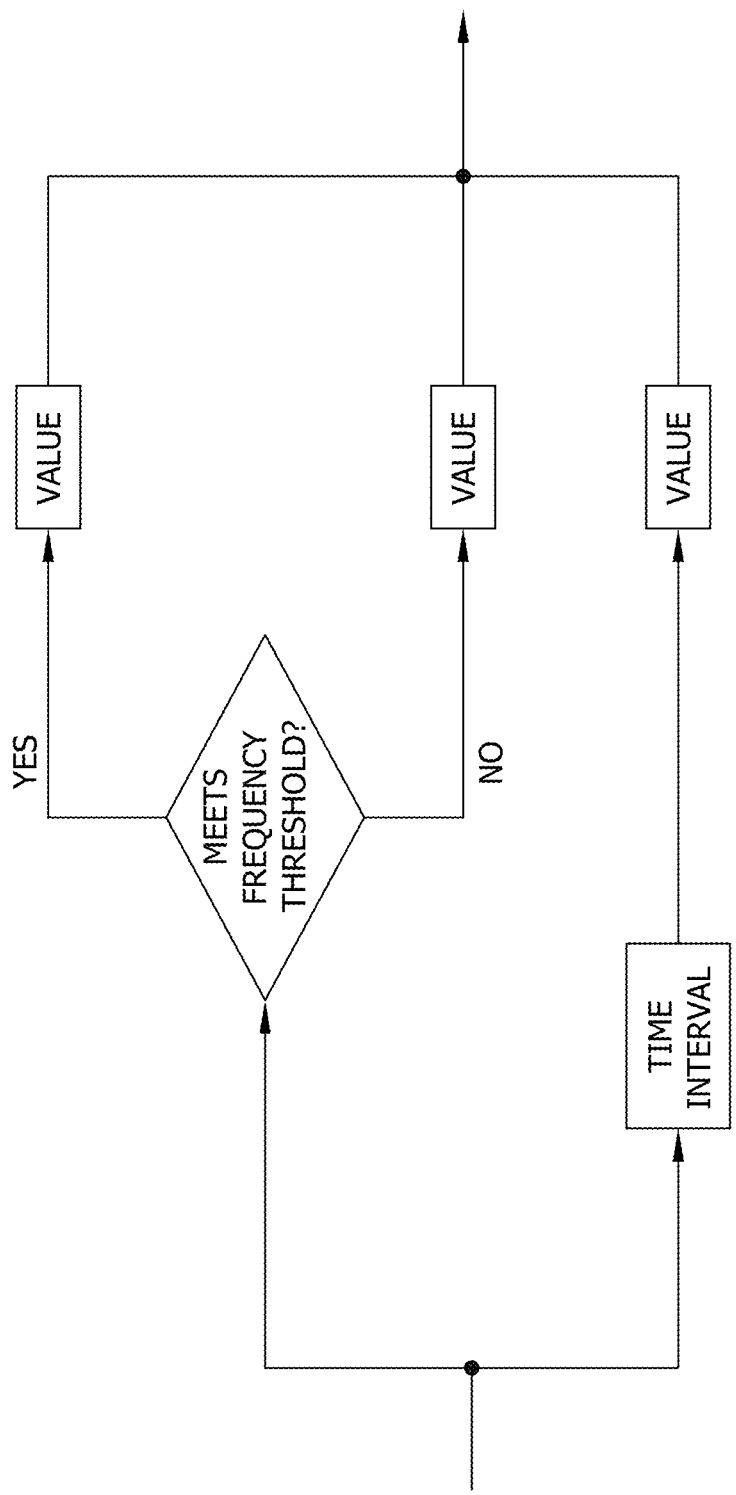
FIG. 14 further illustrates an exemplary weighting process for temporal characteristics of FIG. 9.

FIG. 14 further illustrates the weighting process for temporal characteristics 916. In an embodiment, RAMP engine 906 determines how often the IP address in question has been listed as a high risk over a predefined time interval and compares that number to a predefined threshold value. When the number of times the IP address has been listed as high-risk over the time interval exceeds the threshold value, a frequent weighting value $w_1, w_2, \ldots, w_n$ is assigned to the risk score, where $w_i > 0$ and $w_i < 2$, yielding ±100%. When the number of times the IP address has been listed as high-risk over the time interval does not exceed the threshold value a "not frequent" weighting value is assigned to the risk score. In another embodiment, RAMP engine 906 determines the time interval since the IP address was previously listed as being a high risk. A time interval weighting value is assigned to the risk score that is proportional to the determined time interval.

Figure 15:
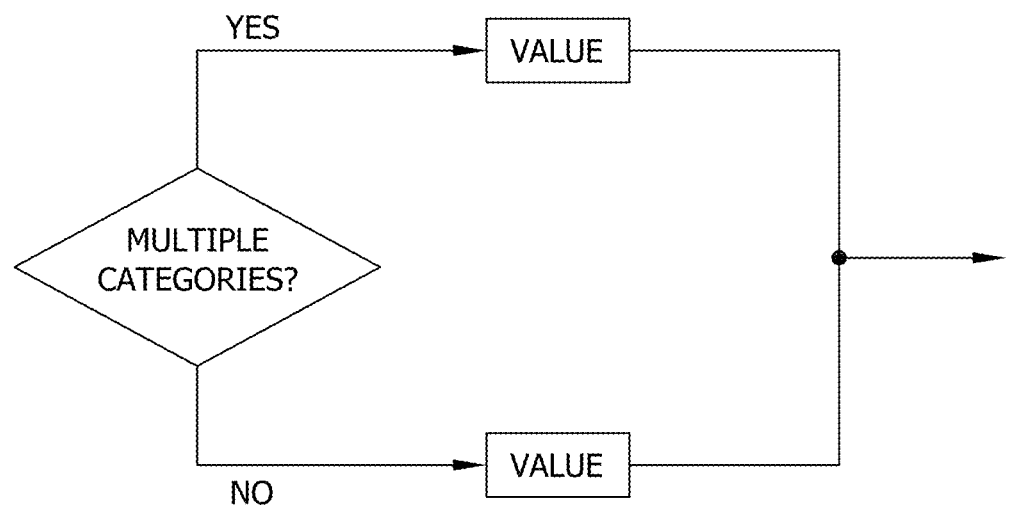
FIG. 15 further illustrates an exemplary weighting process for multiple category characteristics of FIG. 9.

Referring now to FIG. 15, a plurality of IRIPs may list a certain IP address in more than one named risk category. The exemplary weighting process for multiple category characteristics 920 accounts for this situation. For example, one IRIP may list a particular IP address as spam, whereas another IRIP may list the same IP address as both spam and a Tor Exit Node. In an embodiment, RAMP engine 906 determines whether the IP address is listed in more than one named risk category and assigns a "multiple" weighting value when it is listed in more than one category and assigns a "not multiple" weighting value when it is not listed in more than one category. Further, the RAMP engine may assign a multiple category weighting value that is proportional to the number of named risk categories in which the IP address has been listed.

Figure 17:
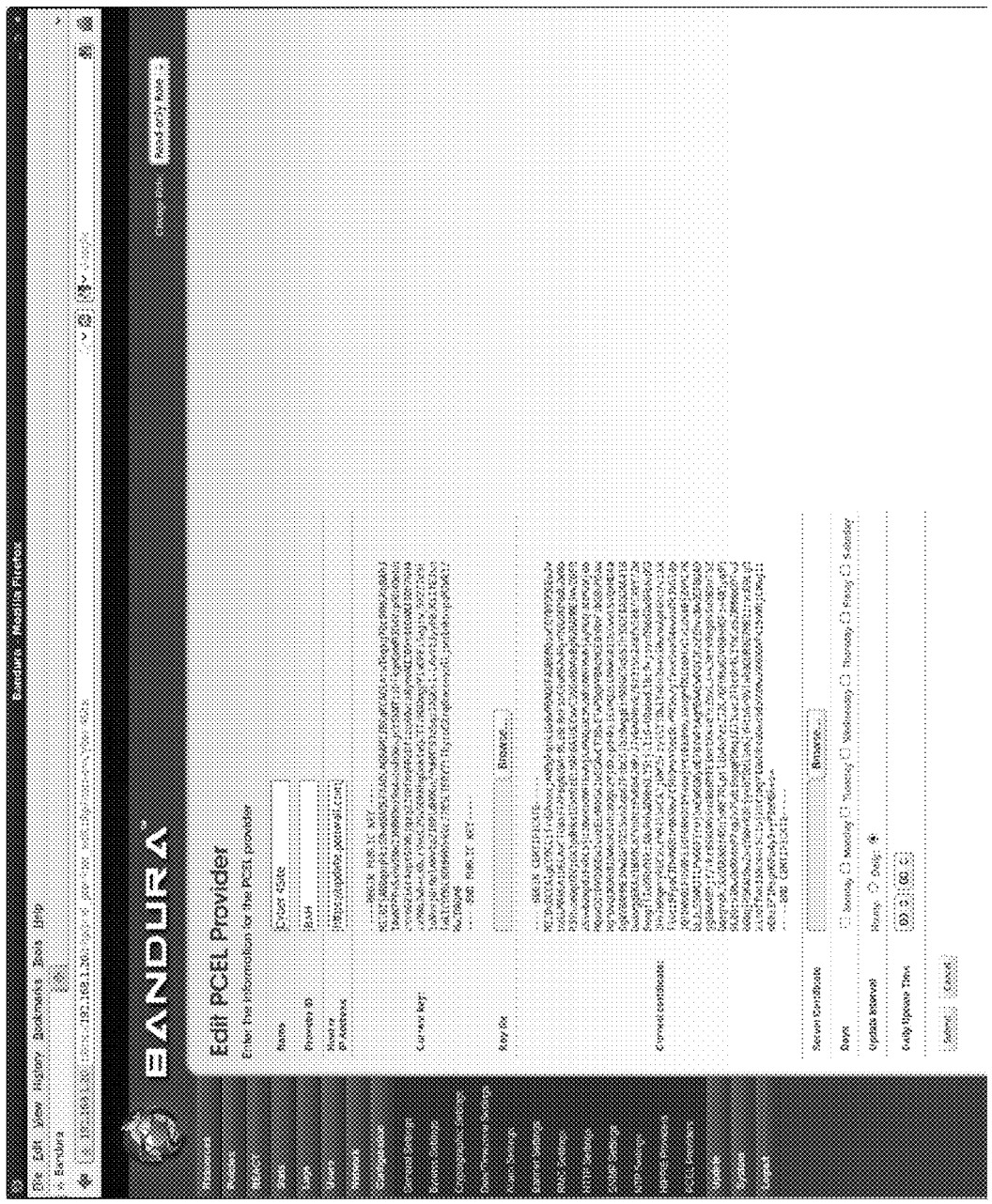
FIGS. 17-20 are screenshots of an exemplary user interface in accordance with an embodiment of the invention.

Referring again to the embodiment illustrated by FIG. 17, after the various weighting factors have been assigned to the IP address, the weighted values are then used by the mathematical transform 922 (e.g., a linear transform, an exponential transform, or a logarithmic transform) to apply an adjustment to the risk score.

The exemplary flow diagram illustrated in FIGS. 16A and 16B shows that after the mathematical transformation, all IP addresses in a named risk category are aggregated to determine an aggregate risk score. An acceptable risk level is received and used to determine if the aggregate risk score for the category is less than the acceptable risk level for the category. Based on the aggregate risk score, aspects of the invention render a decision or otherwise determine an action. Exemplary actions include a decision to allow traffic, re-route the traffic, allow the traffic but make a record of it, etc. In one embodiment, when the aggregate risk score is less than the acceptable risk level, communications from IP addresses included in the aggregate risk score are allowed to pass through a network firewall. When the aggregate risk score is greater than or equal to the acceptable risk level, communications from IP addresses included in the aggregate risk score are not allowed to pass through a network firewall. It is to be understood that any combination of weighted risk scores can be aggregated.

FIG. 17 illustrates an exemplary graphical user interface (GUI) in accordance with an embodiment of the invention. The user interface of FIG. 17 allows a user to enter and edit information relating to an IP threat information provider, such as an IRIP. The entering and editing of information allows IP threat information providers to be added to a list of providers from which IP threat information is acquired. Exemplary information that may be entered and/or edited includes a name of an IP threat information provider, a provider ID, a provider uniform resource locator or IP address, a cryptographic key, a security certificate, and/or IP threat information acquisition preferences.

Figure 18:
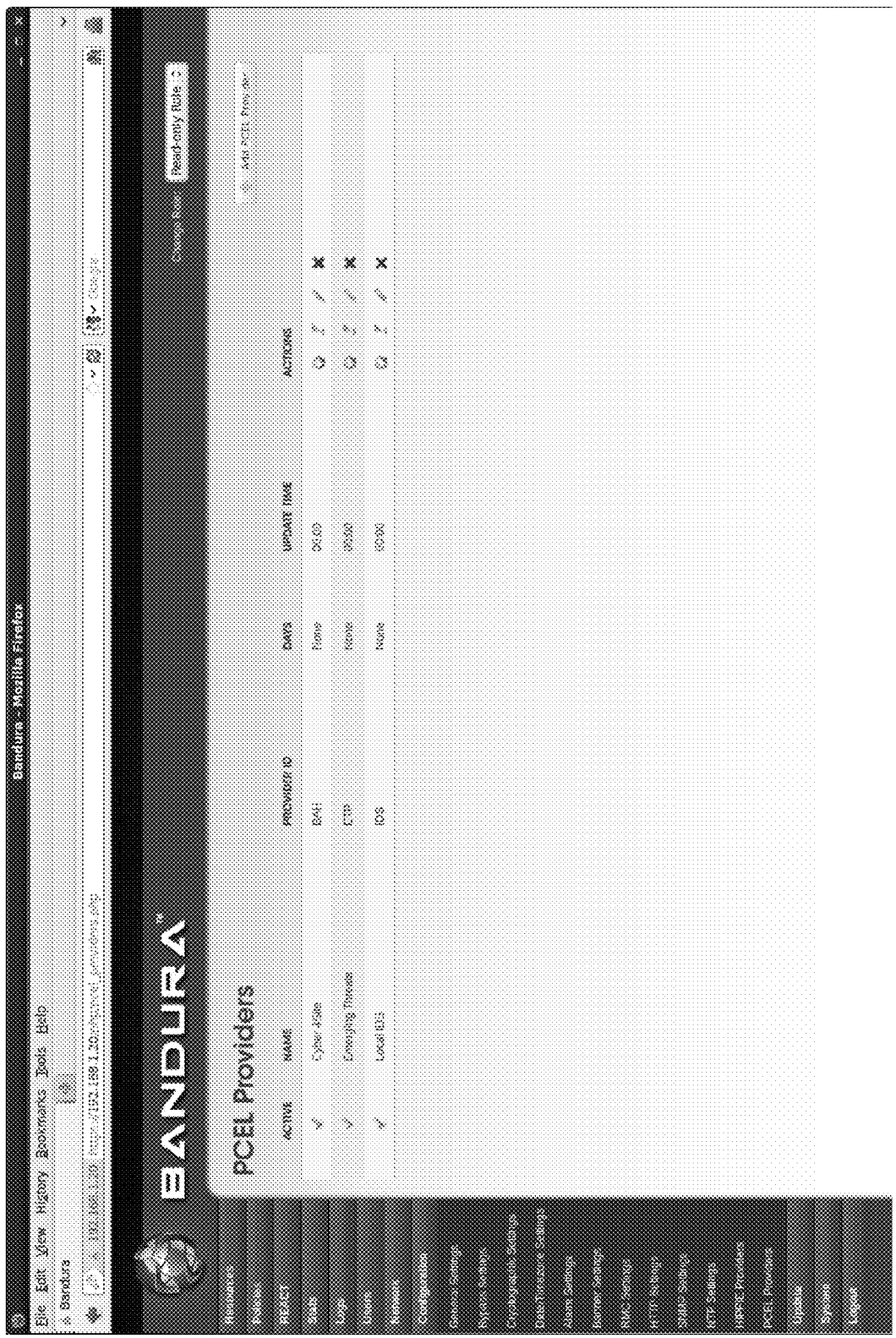

FIG. 18 illustrates an exemplary GUI in accordance with an embodiment of the invention. The user interface of FIG. 18 displays IP threat information providers for which a user has entered information. The display allows a user to quickly determine which IP threat information providers are currently being utilized and information associated with those providers. Exemplary information that may be displayed includes a provider active status, a provider name, a provider ID, and IP threat information acquisition details. The display also allows a user to enter commands to perform certain actions. Exemplary actions include activating the threat information acquired from a certain provider, editing provider information, deleting a provider, and reacquiring IP threat information from the provider.

Figure 19:
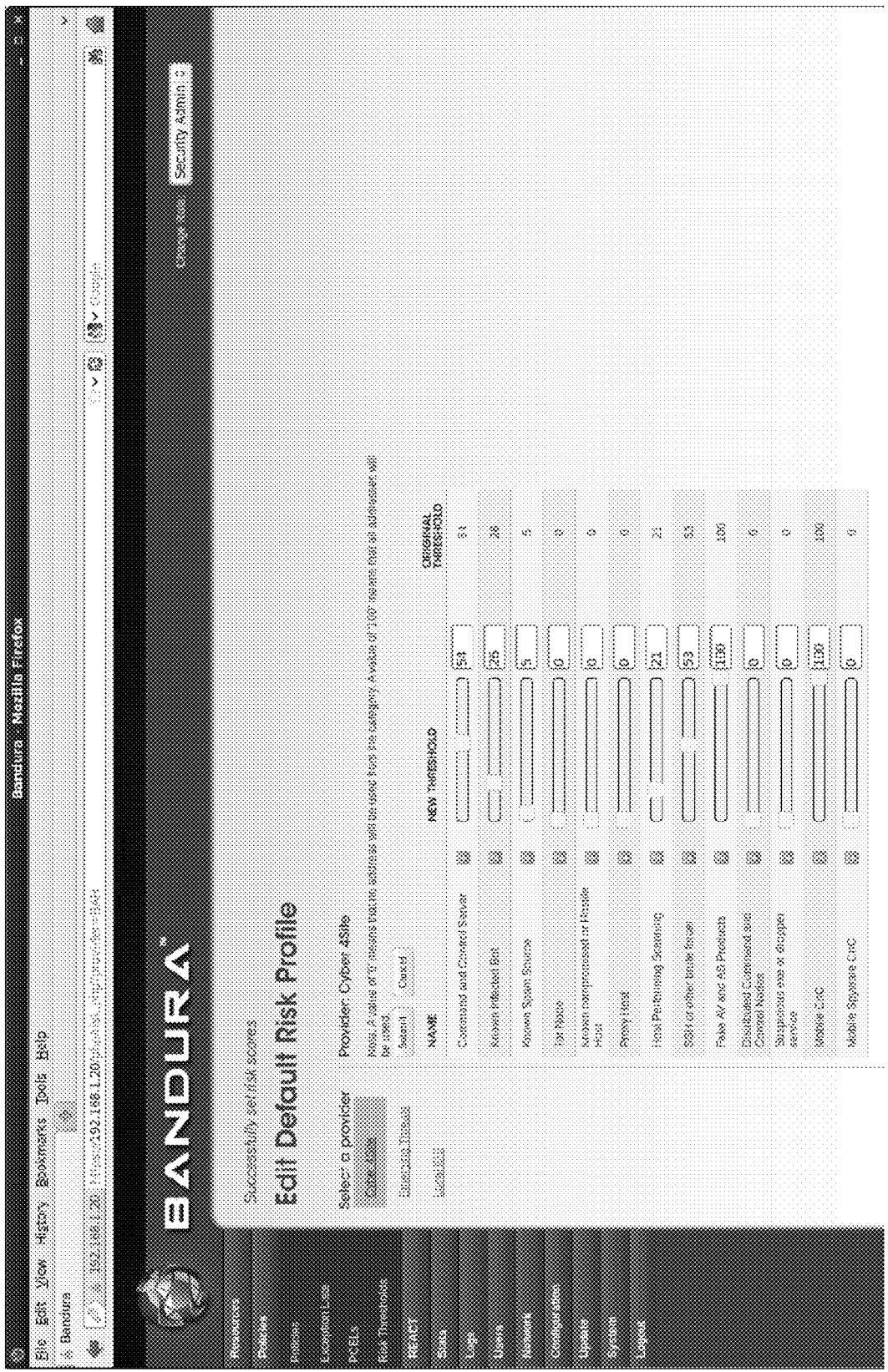
Figure 20:
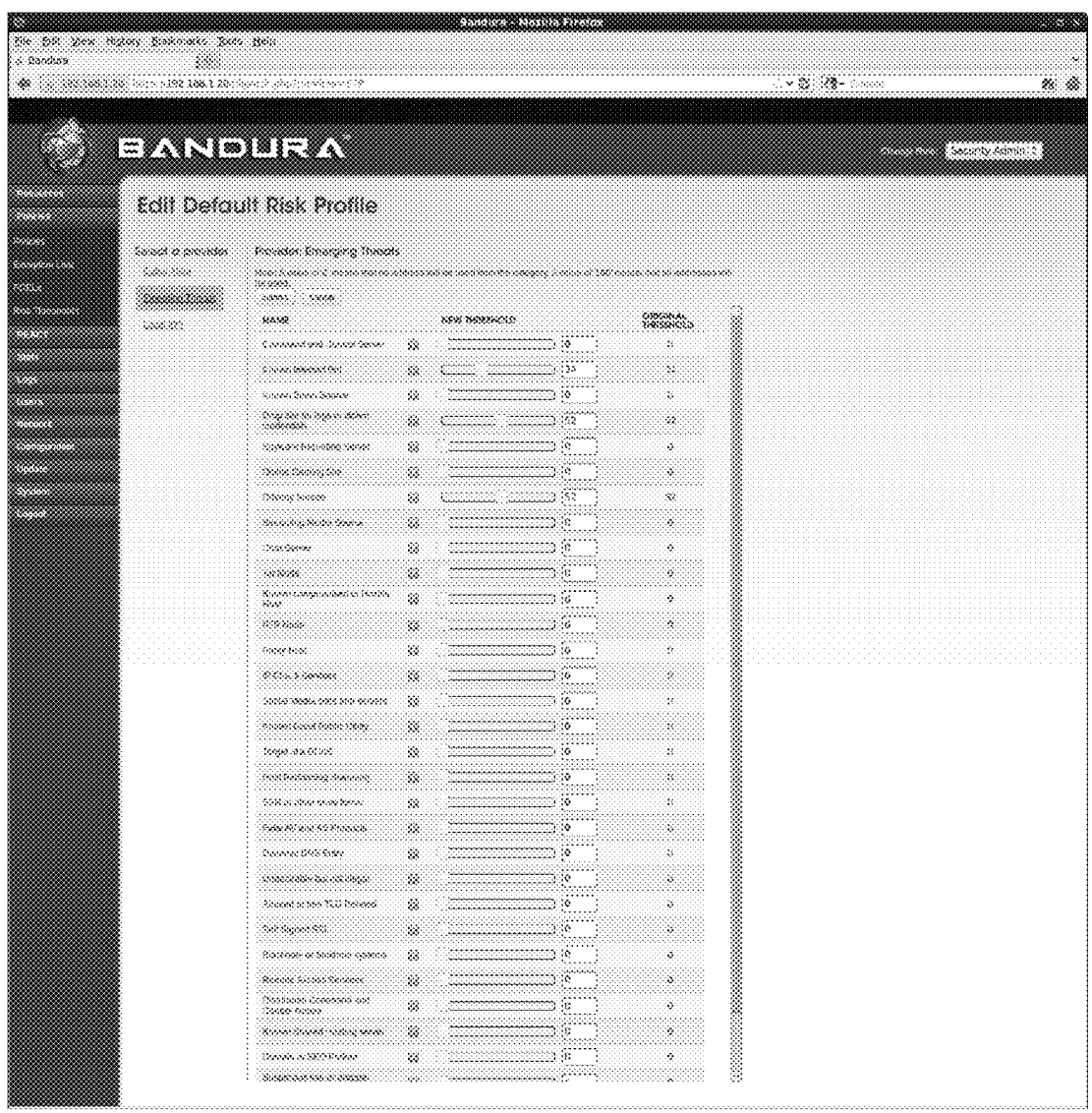

FIGS. 19 and 20 each illustrate an exemplary GUI in accordance with an embodiment of the invention. In each, GUI displays to a user a plurality of named risk categories, provides a series of "slider" input controls or the like, and provides a range of weighted values corresponding to each named risk category. In an embodiment, the user can select a particular risk category and move the slider control corresponding to that category to a particular weight value (e.g., ranging from 0 to 100) that becomes the acceptable risk level for that category. Preferably, the user is also provided a default weight value that can be used as a reference to determine if the weight value for a selected category should be increased or decreased based on a current risk assessment as provided by the IRIPs. It is contemplated that other control means could be used to input and assign the weight values, including "spinners," "gauges," text entry fields, and like input methods.

Each IRIP may use different numerical values for assigning confidence to each IP address. The numerical values are normalized before being mapped to the slider positions. The assigned weights are used in the calculation of composite scores from all IRIP data, which is then stored in RAMP engine 906.

In an embodiment, a second set of slider controls are used to set a required confidence level to block connections. For example, there is one slider for each defined category of risk. The user can set a default acceptable risk score for each category, and the user may also set unique levels for each protected resource in their network. If an IP address is stored in the RAMP engine, and the stored confidence level is greater than the value set by using the slider, the connections to/from the network resource are blocked.

Referring further to RAMP engine 906, processing each IP packet (e.g., either an IPv4 or IPv6 IP address) against the assigned risk database utilizes a high-performance look-up engine such as RAMP engine 906. The RAMP engine 906 embodying aspects of the invention is capable updates in real time with a feed of IP addresses.

To protect multiple network resources where each resource has a different risk profile, RAMP engine 906 must be able to edit a ""list"" of IP addresses stored in memory without recompilation. Storing a risk confidence score (e.g., an aggregate risk score) for each risk category allows RAMP engine 906 to be used to protect multiple network resources, with each protected resource having a different acceptable risk profile that is acceptable to the user.

Methods for sorting a plurality of IP addresses are known in the art. One known method uses Bloom filters to quickly determine whether an IP address is not stored in a data store (e.g., memory or a database). Bloom filters can be used to improve look up speeds, but a Bloom filter must be rewritten if a data entry (e.g., blocked IP address) is removed from the data store. For instance, when using a Bloom filter there is no mechanism for deleting an entry (e.g., IP address) from the data store without recompiling the entire IP address list minus the entry to be deleted. The RAMP engine 906 uses a Bloom filter, for example, to take advantage of faster access time, and include a grouping of confidence scores that are assigned to each IP address. Typically, storing both the confidence scores with each IP address would require 32-bits of storage to access 8 bits of data (for data alignment requirements), which would typically require doubling the storage requirements and also doubling the chance of a cache miss.

Aspects of the present invention speed access times by using an index to each IP address and using the same index to access a confidence score. For example, by mapping a confidence score with an IP address, the disclosed threat assessment process is able to store the data items separately allowing for better memory utilization and a higher cache hit ratio. Thus, an IP address can be effectively removed by a filtering decision based on a confidence score stored in the database, without rebuilding any data stores or recompiling. In this manner, RAMP engine 906 can store the confidence rating, use an index to map IP addresses, and in an embodiment, use a Bloom filter without recompiling an entire IP address list. When new IP addresses arrive via the real-time feed, the new IP addresses are stored in a secondary store and may be processed by the RAMP engine by the RAMP engine replacing the old data store with the secondary store, and then discarding the secondary store.

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices, including memory storage devices.

An exemplary system for implementing aspects of the invention includes a special purpose computing device in the form of a computing device, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media is non-transitory and includes, but is not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embodies computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input devices (not shown), such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as a video adapter. In addition to the monitor, personal computers typically include other peripheral output devices (not shown), such as speakers and printers.

One or more aspects of the invention may be embodied in data and/or computer-executable or processor-executable instructions (i.e., software), routine or function stored in system memory or non-volatile memory as application programs, program modules and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer-readable storage media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over the wide area network may be used.

Preferably, computer-executable instructions are stored in a memory, such as hard disk drive, and executed by the computer. Advantageously, the computer processor has the capability to perform all operations (e.g., execute computer-executable instructions) in real-time.

In operation, a system embodying aspects of the invention determines an aggregate risk score for a plurality of IP addresses. In doing so, the system receives a plurality of IP addresses from one or more internet risk intelligence providers (IRIPs) for a particular category, determines if the one or more received IP addresses are associated with more than one category, and determines source characteristics for each of the received IP addresses for a category. Moreover, the system assigns a weighting factor to each of the source characteristics for each category, adjusts a confidence level for each of the received IP addresses by using a mathematical transform based on the weighting factors for each category, and determines an aggregate risk score for all the IP addresses based on the adjusted confidence levels. Depending on a risk level for each category that is acceptable to the user, the system compares the aggregate risk score with the received acceptable risk level from the user and allows IP addresses having an acceptable risk level to pass through the network's firewall.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer network firewall system comprising:
  at least one tangible, non-transitory a computer-readable medium storing processor-executable instructions;

a threat assessment processor programmed to execute the instructions, wherein the instructions, when executed by the processor, configure the firewall system to:
  acquire a plurality of threat information from one or more internet risk intelligence providers (IRIPs) via a computer communications network;
  store the plurality of threat information on the computer-readable medium, the threat information including an IP address, a risk category associated with the IP address, and a risk confidence level associated with the IP address, the threat information further including a determination of geographic proximity characteristics associated with the IP address in relation to geographic proximity characteristics associated with one or more other IP addresses having risk confidence levels exceeding a threshold level;
  determine a risk category value associated with the IP address as a function of:
    the risk confidence level stored on the computer-readable medium, and
    timing information stored on the computer-readable medium, the timing information comprising:
      a number of instances the risk confidence level has exceeded the risk category acceptance level during a first time interval, and
      a second time interval representing the elapsed time since the risk confidence level previously exceeded the risk category acceptance level; and
  block computer network communications with a computing device associated with the IP address when the risk category value is greater than or equal to a risk category acceptance level.

2. The computer network firewall system of claim 1, wherein the timing information is based on a timestamp corresponding to the acquisition of the plurality of threat information on the computer-readable medium.

3. The computer network firewall system of claim 1, wherein the instructions, when executed by the processor, further configure the firewall system to:
  receive the risk category acceptance level from a user via a graphical user interface;
  compare the risk category value to the risk category acceptance level; and
  allow communications with the computing device associated with the IP address when the risk category value is less than the risk category acceptance level.

4. The computer network firewall system of claim 1, wherein the threat information further includes a determination of whether the IP address is acquired from more than one IRIP and wherein the instructions, when executed by the processor, further configure the firewall system to adjust the risk category value associated with the IP address as a function of a multiple IRIP weighting factor when the IP address is acquired from more than one IRIP, the multiple IRIP weighting factor increasing the risk category value.

5. The computer network firewall system of claim 1, wherein the threat information further includes a determination of whether the IP address is associated with more than one risk category and wherein the instructions, when executed by the processor, further configure the firewall system to adjust the risk category value associated with the IP address as a function of a multiple category weighting factor when the IP address is associated with more than one risk category, the multiple category weighting factor increasing the risk category value.

6. The computer network firewall system of claim 1, wherein the threat information further includes a determination of source characteristics and destination characteristics associated with the IP address and wherein the instructions, when executed by the processor, further configure the firewall system to adjust the risk category value associated with the IP address as a function of a source/destination weighting factor corresponding to the source characteristics and the destination characteristics.

7. The computer network firewall system of claim 6, wherein the source characteristics and the destination characteristics comprise at least one of: a geographic area, a country, a business sector, an industrial sector, and a political region.

8. The computer network firewall system of claim 1, wherein the threat information further includes a determination of Internet Service Provider (ISP) characteristics associated with the IP address and wherein the instructions, when executed by the processor, further configure the firewall system to adjust the risk category value associated with the IP address as a function of an ISP weighting factor corresponding to the ISP characteristics, the ISP weighting factor increasing the risk category value.

9. A computer network firewall system comprising:
  at least one tangible, non-transitory a computer-readable medium storing processor-executable instructions;
  a threat assessment processor programmed to execute the instructions, wherein the instructions, when executed by the processor, configure the firewall system to:
    acquire a plurality of threat information from one or more internet risk intelligence providers (IRIPs) via a computer communications network;
    store the plurality of threat information on the computer-readable medium, the threat information including an IP address, a risk category associated with the IP address, and a risk confidence level associated with the IP address, the threat information further including a determination of source characteristics and destination characteristics associated with the IP address;
    determine a risk category value associated with the IP address as a function of:
      the risk confidence level stored on the computer-readable medium, and
      timing information stored on the computer-readable medium, the timing information comprising:
        a number of instances the risk confidence level has exceeded the risk category acceptance level during a first time interval, and
        a second time interval representing the elapsed time since the risk confidence level previously exceeded the risk category acceptance level;
    adjust the risk category value associated with the IP address as a function of a source/destination weighting factor corresponding to the source characteristics and the destination characteristics; and
    block computer network communications with a computing device associated with the IP address when the risk category value is greater than or equal to a risk category acceptance level.

10. The computer network firewall system of claim 9, wherein the timing information is based on a timestamp corresponding to the acquisition of the plurality of threat information on the computer-readable medium.

11. The computer network firewall system of claim 9, wherein the instructions, when executed by the processor, further configure the firewall system to:

receive the risk category acceptance level from a user via a graphical user interface;

compare the risk category value to the risk category acceptance level; and allow communications with the computing device associated with the IP address when the risk category value is less than the risk category acceptance level.

12. The computer network firewall system of claim 9, wherein the threat information further includes a determination of whether the IP address is acquired from more than one IRIP and wherein the instructions, when executed by the processor, further configure the firewall system to adjust the risk category value associated with the IP address as a function of a multiple IRIP weighting factor when the IP address is acquired from more than one IRIP, the multiple IRIP weighting factor increasing the risk category value.

13. The computer network firewall system of claim 9, wherein the threat information further includes a determination of whether the IP address is associated with more than one risk category and wherein the instructions, when executed by the processor, further configure the firewall system to adjust the risk category value associated with the IP address as a function of a multiple category weighting factor when the IP address is associated with more than one risk category, the multiple category weighting factor increasing the risk category value.

14. The computer network firewall system of claim 9, wherein the source characteristics and the destination characteristics comprise at least one of: a geographic area, a country, a business sector, an industrial sector, and a political region.

15. The computer network firewall system of claim 9, wherein the threat information further includes a determination of Internet Service Provider (ISP) characteristics associated with the IP address and wherein the instructions, when executed by the processor, further configure the firewall system to adjust the risk category value associated with the IP address as a function of an ISP weighting factor corresponding to the ISP characteristics, the ISP weighting factor increasing the risk category value.

16. The computer network firewall system of claim 9, wherein the threat information further includes a determination of geographic proximity characteristics associated with the IP address in relation to geographic proximity characteristics associated with one or more other IP addresses having risk confidence levels exceeding the threshold level and wherein the instructions, when executed by the processor, further configure the firewall system to adjust the risk category value associated with the IP address as a function of a geographic weighting factor corresponding to the geographic proximity characteristics associated with the IP address, the geographic weighting factor increasing the risk value.

17. A system for protecting a network from a security threat in real-time, the system comprising:

a memory storing a plurality of Internet Protocol (IP) addresses, timing information associated with each of the plurality of IP addresses, a risk category associated with each of the plurality of IP addresses, a risk confidence level associated with each of the plurality of IP addresses, and a plurality of threat information, the threat information including a determination of source characteristics and destination characteristics associated with each of the plurality of IP addresses;

a graphical user interface (GUI) for displaying a plurality of risk categories associated with the plurality of IP addresses on a display, and for receiving input from a user, the input including a risk acceptance level for each of the plurality of risk categories;

a non-transitory computer-readable storage medium having stored thereon computer processor-executable instructions;

a threat processor executing the computer-executable instructions, said instructions comprising:

receiving a plurality of IP addresses associated with a particular risk category from one or more internet risk intelligence providers;

when the one or more received IP addresses are associated with more than one risk category, assigning a source/destination weighting factor for each risk category based on the source characteristics and the destination characteristics associated with the received IP addresses associated therewith;

adjusting a confidence level for each of the received IP addresses based on the source/destination weighting factor for each risk category;

determining an aggregate risk score for all the IP addresses based on the adjusted confidence levels;

storing the aggregate risk score in a memory device;

receiving an acceptable risk level for each category from the user, wherein the aggregate risk score is a function of a number of instances the risk confidence level for each of the received IP addresses has exceeded the acceptable risk level during a time interval based on the timing information associated therewith;

comparing the stored aggregate risk score with the received acceptable risk level from the user; and allowing communications from any IP addresses having an acceptable risk level to pass through the network's firewall.

* * * * *